(12) United States Patent
Chang et al.

(10) Patent No.: US 11,144,176 B2
(45) Date of Patent: Oct. 12, 2021

(54) USER INTERFACES FOR ELECTRONIC VOICE COMMUNICATIONS

(71) Applicant: Apple Inc., Cupertino, CA (US)

(72) Inventors: Jae Woo Chang, San Jose, CA (US); Jonathan P. Ive, San Jose, CA (US); Stephen O. Lemay, Palo Alto, CA (US); Matthew J. Sundstrom, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/565,257

(22) Filed: Sep. 9, 2019

(65) Prior Publication Data

US 2020/0379617 A1 Dec. 3, 2020

Related U.S. Application Data

(60) Provisional application No. 62/855,987, filed on Jun. 1, 2019.

(51) Int. Cl.
| | |
|---|---|
| *G06F 3/0482* | (2013.01) |
| *G06F 3/0484* | (2013.01) |
| *H04L 12/18* | (2006.01) |
| *H04L 29/08* | (2006.01) |
| *H04B 1/3827* | (2015.01) |

(52) U.S. Cl.
CPC .......... *G06F 3/0482* (2013.01); *G06F 3/0484* (2013.01); *H04L 12/1818* (2013.01); *H04L 12/1822* (2013.01); *H04L 67/141* (2013.01); *H04B 1/3827* (2013.01)

(58) Field of Classification Search
None
See application file for complete search history.

(56) References Cited

U.S. PATENT DOCUMENTS

| | | | |
|---|---|---|---|
| 6,754,342 B1 | 6/2004 | Surazski et al. | |
| 7,311,608 B1 * | 12/2007 | Danieli | A63F 13/12 463/42 |
| 7,683,925 B2 | 3/2010 | Lee | |

(Continued)

FOREIGN PATENT DOCUMENTS

| | | |
|---|---|---|
| CN | 1538773 A | 10/2004 |
| CN | 1758778 A | 4/2006 |

(Continued)

OTHER PUBLICATIONS

Johnson, L. (Jan. 29, 2019). How to use the Walkie-Talkie app on Apple Watch. Retrieved Aug. 29, 2020, from https://www.macworld.com/article/3336863/how-to-use-the-walkie-talkie-app-on-apple-watch.html (Year: 2019).*

(Continued)

*Primary Examiner* — Arpan P. Savla
*Assistant Examiner* — Linda Huynh
(74) *Attorney, Agent, or Firm* — Dentons US LLP

(57) ABSTRACT

The present disclosure generally relates to user interfaces for managing electronic voice communications using an electronic device. In some embodiments, techniques for managing user contacts for electronic voice communications using an electronic device are described. In some embodiments, techniques for managing incoming and outgoing electronic voice communications using an electronic device are described.

30 Claims, 29 Drawing Sheets

(56) References Cited

U.S. PATENT DOCUMENTS

| | | | |
|---|---|---|---|
| 7,865,205 B1 | 1/2011 | Lundy et al. | |
| 8,064,398 B2 | 11/2011 | Agashe et al. | |
| 8,559,356 B2 | 10/2013 | Shiizaki et al. | |
| 8,606,576 B1 | 12/2013 | Barr et al. | |
| 8,970,662 B2 | 3/2015 | Kerger et al. | |
| 8,971,946 B2 | 3/2015 | Ahmed et al. | |
| 9,179,277 B2 | 11/2015 | Kerger et al. | |
| 9,430,186 B2 | 8/2016 | Faaborg et al. | |
| 9,575,720 B2 | 2/2017 | Faaborg et al. | |
| 9,947,363 B2 | 4/2018 | Moon et al. | |
| 10,284,812 B1 | 5/2019 | Van Os et al. | |
| 10,419,712 B2 | 9/2019 | Arrasvuori et al. | |
| 10,511,707 B2 | 12/2019 | Johnson et al. | |
| 2004/0192368 A1 | 9/2004 | Edwards et al. | |
| 2004/0228531 A1* | 11/2004 | Fernandez | H04L 51/04 382/187 |
| 2005/0143135 A1 | 6/2005 | Brems et al. | |
| 2005/0181726 A1* | 8/2005 | Gottlieb | H04M 1/2745 455/41.2 |
| 2006/0077996 A1 | 4/2006 | Lee | |
| 2007/0141984 A1 | 6/2007 | Kuehnel et al. | |
| 2008/0165022 A1 | 7/2008 | Herz et al. | |
| 2008/0287099 A1 | 11/2008 | Zonana | |
| 2009/0005023 A1 | 1/2009 | Toorn | |
| 2009/0083382 A1 | 3/2009 | Rosenberg et al. | |
| 2009/0161621 A1 | 6/2009 | Suga | |
| 2010/0062749 A1 | 3/2010 | Yasuda et al. | |
| 2011/0013075 A1 | 1/2011 | Kim et al. | |
| 2011/0130113 A1 | 6/2011 | Takuno | |
| 2011/0157046 A1 | 6/2011 | Lee et al. | |
| 2012/0124516 A1 | 5/2012 | Friedman | |
| 2013/0109425 A1 | 5/2013 | Kerger et al. | |
| 2013/0295982 A1 | 11/2013 | Lee et al. | |
| 2013/0315108 A1 | 11/2013 | Lindner et al. | |
| 2014/0039894 A1 | 2/2014 | Shostak | |
| 2014/0064463 A1 | 3/2014 | Reddy | |
| 2014/0213236 A1 | 7/2014 | Jimbo et al. | |
| 2014/0267543 A1 | 9/2014 | Kerger et al. | |
| 2014/0287728 A1* | 9/2014 | Lim | H04W 4/16 455/414.1 |
| 2015/0040012 A1 | 2/2015 | Faaborg et al. | |
| 2015/0089398 A1* | 3/2015 | Song | G06F 21/6245 715/753 |
| 2015/0126169 A1 | 5/2015 | Kerger et al. | |
| 2015/0127741 A1* | 5/2015 | Leacock | H04L 51/043 709/204 |
| 2015/0141072 A1 | 5/2015 | Mumick | |
| 2015/0261496 A1 | 9/2015 | Faaborg et al. | |
| 2015/0341759 A1 | 11/2015 | Kerger et al. | |
| 2016/0062540 A1* | 3/2016 | Yang | G06F 3/0416 345/173 |
| 2016/0066277 A1 | 3/2016 | Yang et al. | |
| 2016/0191694 A1 | 6/2016 | Kim et al. | |
| 2016/0255481 A9* | 9/2016 | Arnold | H04W 4/14 455/466 |
| 2017/0048388 A1 | 2/2017 | Sharpe | |
| 2017/0223162 A1 | 8/2017 | Wilder et al. | |
| 2018/0018701 A1* | 1/2018 | Berry, Jr. | H04L 51/14 |
| 2018/0193753 A1* | 7/2018 | Kiwada | A63F 13/35 |
| 2018/0309801 A1* | 10/2018 | Rathod | H04L 67/141 |
| 2018/0338026 A1 | 11/2018 | Jon et al. | |
| 2018/0338035 A1 | 11/2018 | Johnson et al. | |
| 2019/0318283 A1 | 10/2019 | Kelly et al. | |
| 2020/0068066 A1 | 2/2020 | Johnson et al. | |
| 2020/0201540 A1 | 6/2020 | Zambetti et al. | |
| 2020/0213436 A1 | 7/2020 | Mumick | |

FOREIGN PATENT DOCUMENTS

| | | |
|---|---|---|
| CN | 1859501 A | 11/2006 |
| CN | 105191252 A | 12/2015 |
| CN | 105453025 A | 3/2016 |
| CN | 105786394 A | 7/2016 |
| CN | 106104677 A | 11/2016 |
| EP | 1643738 A1 | 4/2006 |
| EP | 2782297 A1 | 9/2014 |
| EP | 2974206 A1 | 1/2016 |
| EP | 2974206 B1 | 6/2019 |
| JP | 2008-257363 A | 10/2008 |
| KR | 10-2016-0097913 A | 8/2016 |
| WO | 2001/67363 A1 | 9/2001 |
| WO | 2005/031544 A2 | 4/2005 |
| WO | 2005/057890 A2 | 6/2005 |
| WO | 2007/139580 A1 | 12/2007 |
| WO | 2014/164666 A1 | 10/2014 |
| WO | 2015/017043 A1 | 2/2015 |
| WO | 2016/060848 A1 | 4/2016 |

OTHER PUBLICATIONS

Clover, J. (Sep. 19, 2018). How to Use Walkie-Talkie in watchOS 5. Retrieved Aug. 29, 2020, from https://www.macrumors.com/how-to/use-walkie-talkie-in-watchos-5/ (Year: 2019).*

Clover, J. (Sep. 19, 2018). How to Use Walkie-Talkie in watchOS 5. Retrieved Aug. 29, 2020, from https://www.macrumors.com/how-to/use-walkie-talkie-in-watchos-5/ (Year: 2020).*

Johnson, L. (Jan. 29, 2019). How to use the Walkie-Talkie app on Apple Watch. Retrieved Aug. 29, 2020, from https://www.macworld.com/article/3336863/how-to-use-the-walkie-talkie-app-on-apple-watch.html (Year: 2020).*

Decision to Grant received for Danish Patent Application No. PA201870383, dated Jun. 3, 2020, 2 pages.

Invitation to Pay Search Fees received for European Patent Application No. 18730555.2, dated May 14, 2020, 3 pages.

Intention to Grant received for Danish Patent Application No. PA201870383, dated Feb. 11, 2020, 2 pages.

Office Action received for Australian Patent Application No. 2018269510, dated Feb. 21, 2020, 3 pages.

Notice of Acceptance received for Australian Patent Application No. 2018269510, dated Apr. 17, 2020, 3 pages.

Certificate of Examination received for Australian Patent Application No. 2019100525, dated Aug. 6, 2019, 2 pages.

International Search Report and Written Opinion received for PCT Patent Application No. PCT/US2018/033051, dated Nov. 22, 2018, 22 pages.

International Search Report and Written Opinion received for PCT Patent Application No. PCT/US2018/033057, dated Nov. 22, 2018, 19 pages.

Invitation to Pay Additional Fees and Partial International Search Report received for PCT Patent Application No. PCT/US2018/033051, dated Sep. 20, 2018, 14 pages.

Invitation to Pay Additional Fees and Partial Search Report received for PCT Patent Application No. PCT/US2018/033057, dated Sep. 20, 2018, 13 pages.

Non-Final Office Action received for U.S. Appl. No. 15/719,344, dated Feb. 25, 2019, 18 pages.

Notice of Allowance received for U.S. Appl. No. 15/719,344, dated Sep. 26, 2019, 11 pages.

Office Action received for Danish Patent Application No. PA201770395, dated Apr. 11, 2019, 10 pages.

Office Action received for Danish Patent Application No. PA201770395, dated May 25, 2018, 10 pages.

Office Action received for Danish Patent Application No. PA201870383, dated Aug. 26, 2019, 3 pages.

Pocketnow, "AT&T Enhanced Push to Talk: A Guided Tour | Pocketnow", Retrieved from https://www.youtube.com/watch?v=aagcgg07EEc, Dec. 25, 2012, 1 page.

Search Report and Opinion received for Danish Patent Application No. PA201770395, dated Sep. 5, 2017, 14 pages.

Search Report and Opinion received for Danish Patent Application No. PA201870383, dated Sep. 7, 2018, 8 pages.

Non-Final Office Action received for U.S. Appl. No. 15/981,828, dated Jan. 7, 2020, 8 pages.

International Preliminary Report on Patentability received for PCT Patent Application No. PCT/US2018/033051, dated Nov. 28, 2019, 15 pages.

(56) References Cited

OTHER PUBLICATIONS

International Preliminary Report on Patentability received for PCT Patent Application No. PCT/US2018/033057, dated Nov. 28, 2019, 13 pages.
Office Action received for Chinese Patent Application No. 201880030421.5, dated May 22, 2020, 12 pages (7 pages of English Translation and 5 pages of Official Copy).
Notice of Allowance received for U.S. Appl. No. 15/981,828, dated Jul. 13, 2020, 8 pages.
Invitation to Pay Addition Fees and Partial International Search Report received for PCT Patent Application No. PCT/US2020/035345, dated Sep. 29, 2020, 8 pages.
Office Action received for Chinese Patent Application No. 201880036526.1, dated Aug. 21, 2020, 8 pages (3 pages of English Translation and 5 pages of Official Copy).
International Search Report and Written Opinion received for PCT Patent Application No. PCT/US2020/035345, dated Nov. 20, 2020, 16 pages.
Non-Final Office Action received for U.S. Appl. No. 16/667,269, dated Dec. 1, 2020, 17 pages.
Office Action received for European Patent Application No. 18730555.2, dated Sep. 7, 2020, 11 pages.
PROPTT2 Video Push-To-Talk, "ProPTT2 Wearable App with Apple Watch", Retrieved from the Internet: <https://www.youtube.com/watch?v=iqOT30irl4A>, Mar. 29, 2017, 3 pages.
Team on the Run,"Push-To-Talk Feature for Android", Retrieved from the Internet: <https://www.youtube.com/watch?v=_dlrC7q92KQ>, Oct. 14, 2016, 3 pages.
Applicant-Initiated Interview Summary received for U.S. Appl. No. 16/667,269, dated Jan. 25, 2021, 3 pages.
Notice of Allowance received for U.S. Appl. No. 16/667,269, dated Feb. 24, 2021, 9 pages.
Office Action received for European Patent Application No. 18730555.2, dated Feb. 25, 2021, 9 pages.
Search Report and Opinion received for Danish Patent Application No. PA202070167, dated Nov. 25, 2020, 9 pages.

\* cited by examiner

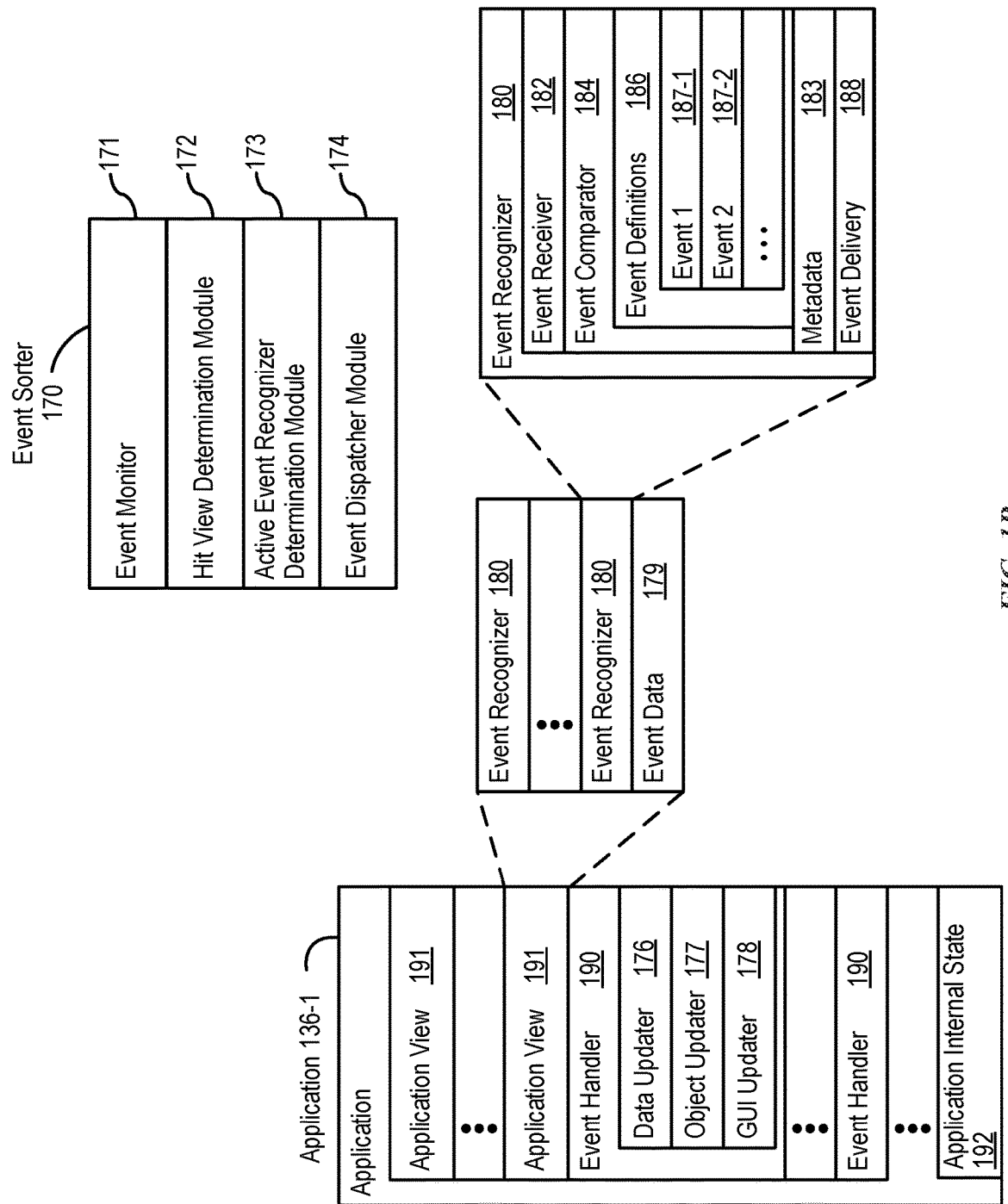

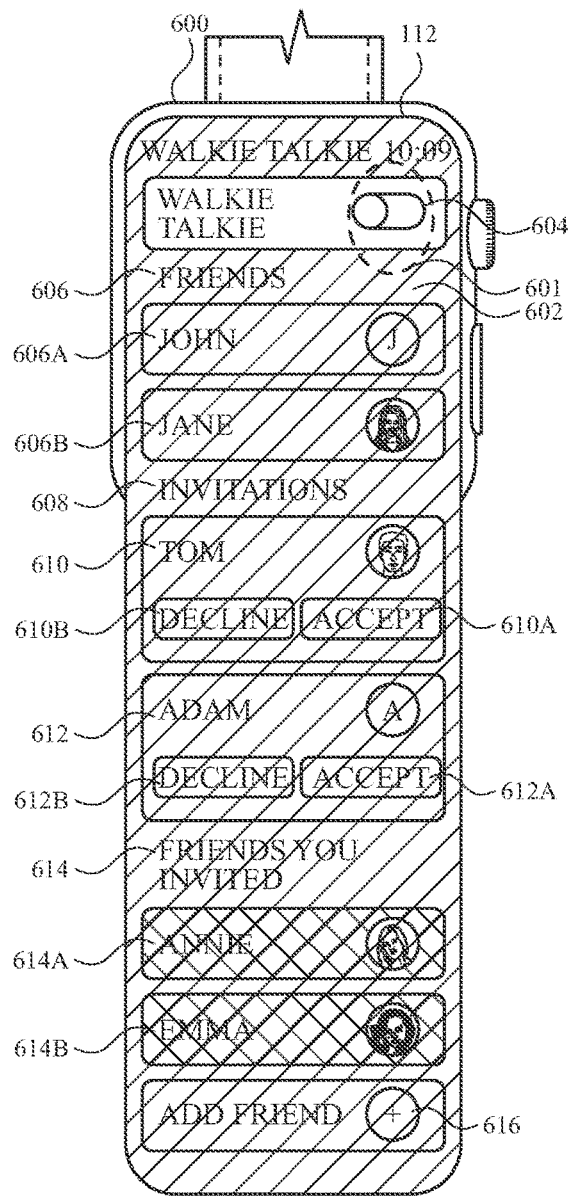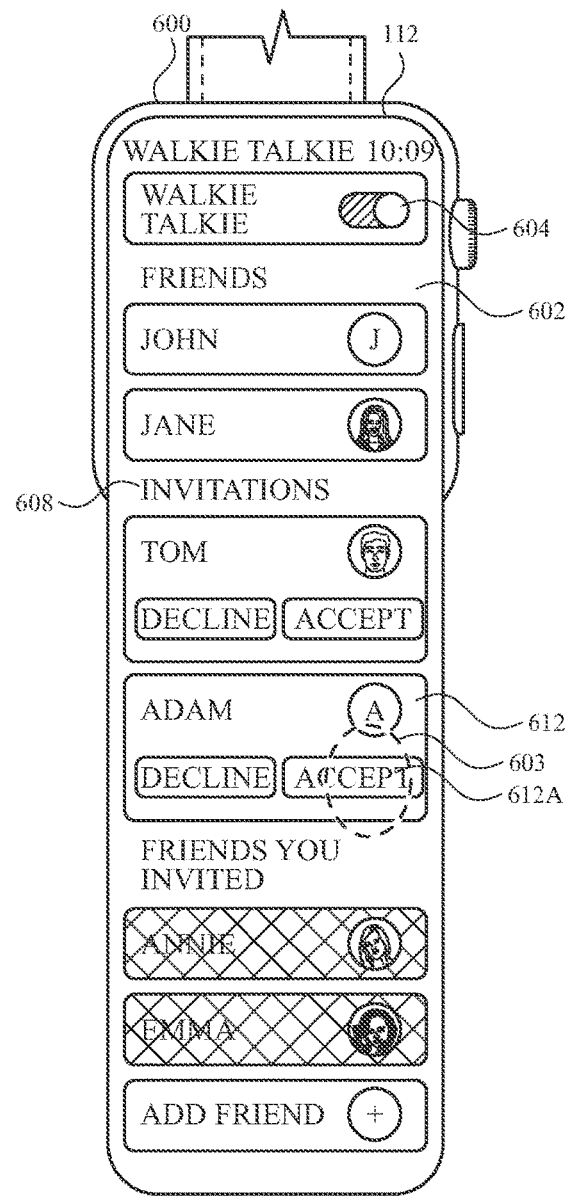
*FIG. 6A*  *FIG. 6B*

722
In accordance with a determination that the first contactable user has sent an invitation to the user of the electronic device to communicate via the first communication application that has not yet been accepted, display, in association with the representation of the first contactable user:

724
An accept affordance that, when selected, accepts the invitation from the first contactable user to the user of the electronic device to communicate via the first communication application.

726
A decline affordance that, when selected, declines the invitation from the first contactable user to the user of the electronic device to communicate via the first communication application.

728
The user of the electronic device has sent an invitation to the first contactable user to communicate via the first communication application that has not yet been accepted and the representation of the first user is displayed with the second value for the first visual property of the representation of the first contactable user.

730
Receive a second user input corresponding to the representation of the first contactable user.

732
In response to receiving the second user input, display, via the display device, a second user interface that includes a re-invite affordance that, when selected, sends another invitation to the first contactable user to communicate via the first communication application, and a rescind invitation affordance that, when selected, rescinds the invitation to the first contactable user to communicate via the first communication application.

*FIG. 7C*

734
Receive a third user input corresponding to a representation of a fourth contactable user that is displayed with the first value for the first visual property of the representation of the fourth contactable user.

736
In response to receiving the third user input, initiate a process for establishing a communication session with the fourth contactable user using the first communication application.

*FIG. 7D*

```
818
The activatable indicator with the second appearance occupies a first area in the communication user interface.

820
In response to receiving the first input and in accordance with a determination that the first input satisfies a set of input criteria, display, via the display device and at a first location in the communication user interface that is outside the first area, an identifier of the second electronic device.
```

```
822
The activatable indicator with the second appearance occupies a second area in the of the communication user interface.

824
In response to receiving the first input and in accordance with a determination that the first input satisfies a set of input criteria displaying, display, via the display device, and at a second location in the communication user interface that is within the second area, an animated sequence of graphical objects.
```

```
826
The animated sequence of graphical objects includes a first graphical object displayed at a first time and a second graphical object displayed at a second time that is later than the first time.

828
At a time at or near the first time, generate a first non-visual output that corresponds to the first graphical object.

830
At a time at or near the second time, generate a second non-visual output that corresponds to the second graphical object.
```

*FIG. 8B*

832
While in a voice communication session with the second electronic device and while the communication user interface includes the activatable indicator, receiving a voice communication from the second electronic device.

834
In response to receiving the voice communication:

836
Generate an audio output that includes a representation of the voice communication.

838
Cease to display the activatable indicator.

840
The activatable indicator occupies a third area of the of the communication user interface and wherein the first visual appearance of the activatable indicator has a first color pattern that includes a first predominant color.

842
In response to receiving the voice communication session, display, via the display device, a non-activatable indicator that occupies the third area and has a second color pattern that includes the first predominant color.

*FIG. 8C*

USER INTERFACES FOR ELECTRONIC VOICE COMMUNICATIONS

CROSS-REFERENCE TO RELATED APPLICATIONS

This application claims priority to U.S. Provisional Patent Application Ser. No. 62/855,987, entitled "USER INTERFACES FOR ELECTRONIC VOICE COMMUNICATIONS," filed Jun. 1, 2019, the contents of which are hereby incorporated by reference in their entirety.

This application relates to U.S. Provisional Patent Application Ser. No. 62/671,991, entitled "VOICE COMMUNICATION METHOD," filed May 15, 2018, to U.S. Provisional Patent Application Ser. No. 62/507,195, entitled "VOICE COMMUNICATION METHOD," filed May 16, 2017, and to U.S. Provisional Patent Application Ser. No. 62/507,167, entitled "VOICE COMMUNICATION METHOD," filed May 16, 2017. The contents of each of these applications are hereby incorporated by reference in their entireties.

FIELD

The present disclosure relates generally to computer user interfaces, and more specifically to user interfaces for managing electronic voice communications.

BACKGROUND

Electronic devices can be used to enable various forms of electronic communication between users. For example, electronic devices can be used to enable electronic voice communications between users, including phone calls, video calls, and interchange of recorded messages.

BRIEF SUMMARY

Some techniques for managing electronic voice communications using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing electronic voice communications. Such methods and interfaces optionally complement or replace other methods for managing electronic voice communications. Such methods and interfaces reduce the cognitive burden on a user and produce a more efficient human-machine interface. For battery-operated computing devices, such methods and interfaces conserve power and increase the time between battery charges. For example, the methods and interfaces contemplated herein offer reduced processing power, reduced memory usage, and reduced battery usage by a display device of the electronic device.

In accordance with some embodiments, a method performed at an electronic device with a display device and a wireless communication radio is described. The method comprises: receiving a first input corresponding to a request to display a first user interface for a first communication application; and in response to receiving the first user input, displaying, on the display device, the first user interface, wherein displaying the first user interface includes concurrently displaying representations of a plurality of contactable users, including a first contactable user and a second contactable user, wherein concurrently displaying the representations of the plurality of contactable users includes: in accordance with a determination that the first contactable user is associated with an accepted invitation to communicate with a user of the electronic device via the first communication application, displaying the representation of the first contactable user with a first value for a first visual property of the representation of the first contactable user; in accordance with a determination that the first contactable user has sent an invitation to the user of the electronic device to communicate via the first communication application that has not yet been accepted, displaying the representation of the first contactable user with the first value for the first visual property of the representation of the first contactable user; in accordance with a determination that the user of the electronic device has sent an invitation to the first contactable user to communicate via the first communication application that has not yet been accepted, displaying the representation of the first contactable user with a second value for the first visual property of the representation of the first contactable user that is different from the first value; in accordance with a determination that the second contactable user is associated with an accepted invitation to communicate with the user of the electronic device via the first communication application, displaying the representation of the second contactable user interface with the first value for a first visual property of the representation of the second contactable user; in accordance with a determination that the second contactable user has sent an invitation to the user of the electronic device to communicate via the first communication application that has not yet been accepted, displaying the representation of the second contactable user interface with the first value for the first visual property of the representation of the second contactable user; and in accordance with a determination that the user of the electronic device has sent an invitation to the first contactable user to communicate via the first communication application that has not yet been accepted, displaying the representation of the second contactable user interface with the second value for the first visual property of the representation of the second contactable user.

In accordance with some embodiments, a non-transitory computer-readable storage medium storing one or more programs configured to be executed by one or more processors of an electronic device with a display device and a wireless communication radio is described. The one or more programs including instructions for: receiving a first input corresponding to a request to display a first user interface for a first communication application; and in response to receiving the first user input, displaying, on the display device, the first user interface, wherein displaying the first user interface includes concurrently displaying representations of a plurality of contactable users, including a first contactable user and a second contactable user, wherein concurrently displaying the representations of the plurality of contactable users includes: in accordance with a determination that the first contactable user is associated with an accepted invitation to communicate with a user of the electronic device via the first communication application, displaying the representation of the first contactable user with a first value for a first visual property of the representation of the first contactable user; in accordance with a determination that the first contactable user has sent an invitation to the user of the electronic device to communicate via the first communication application that has not yet been accepted, displaying the representation of the first contactable user with the first value for the first visual property of the representation of the first contactable user; in accordance with a determination that the user of the electronic device has sent an invitation to the first contactable user to communicate via the first communication application that has not yet been accepted, displaying the representation of the first contactable user with a second value for the first visual property of the representation of the first contactable user that is different from the first value; in accordance with a determination that the second contactable user is associated with an accepted invitation to communicate with the user of the electronic device via the first communication application, displaying the representation of the second contactable user interface with the first value for a first visual property of the representation of the second contactable user; in accordance with a determination that the second contactable user has sent an invitation to the user of the electronic device to communicate via the first communication application that has not yet been accepted, displaying the representation of the second contactable user interface with the first value for the first visual property of the representation of the second contactable user; and in accordance with a determination that the user of the electronic device has sent an invitation to the first contactable user to communicate via the first communication application that has not yet been accepted, displaying the representation of the second contactable user interface with the second value for the first visual property of the representation of the second contactable user.

In accordance with some embodiments, a transitory computer-readable storage medium storing one or more programs configured to be executed by one or more processors of an electronic device with a display device and a wireless communication radio is described. The one or more programs including instructions for: receiving a first input corresponding to a request to display a first user interface for a first communication application; and in response to receiving the first user input, displaying, on the display device, the first user interface, wherein displaying the first user interface includes concurrently displaying representations of a plurality of contactable users, including a first contactable user and a second contactable user, wherein concurrently displaying the representations of the plurality of contactable users includes: in accordance with a determination that the first contactable user is associated with an accepted invitation to communicate with a user of the electronic device via the first communication application, displaying the representation of the first contactable user with a first value for a first visual property of the representation of the first contactable user; in accordance with a determination that the first contactable user has sent an invitation to the user of the electronic device to communicate via the first communication application that has not yet been accepted, displaying the representation of the first contactable user with the first value for the first visual property of the representation of the first contactable user; in accordance with a determination that the user of the electronic device has sent an invitation to the first contactable user to communicate via the first communication application that has not yet been accepted, displaying the representation of the first contactable user with a second value for the first visual property of the representation of the first contactable user that is different from the first value; in accordance with a determination that the second contactable user is associated with an accepted invitation to communicate with the user of the electronic device via the first communication application, displaying the representation of the second contactable user interface with the first value for a first visual property of the representation of the second contactable user; in accordance with a determination that the second contactable user has sent an invitation to the user of the electronic device to communicate via the first communication application that has not yet been accepted, displaying the representation of the second contactable user interface with the first value for the first visual property of the representation of the second contactable user; and in accordance with a determination that the user of the electronic device has sent an invitation to the first contactable user to communicate via the first communication application that has not yet been accepted, displaying the representation of the second contactable user interface with the second value for the first visual property of the representation of the second contactable user.

In accordance with some embodiments, an electronic device comprising a display device; a wireless communication radio; one or more processors; and memory storing one or more programs configured to be executed by the one or more processors is described. The one or more programs including instructions for: receiving a first input corresponding to a request to display a first user interface for a first communication application; and in response to receiving the first user input, displaying, on the display device, the first user interface, wherein displaying the first user interface includes concurrently displaying representations of a plurality of contactable users, including a first contactable user and a second contactable user, wherein concurrently displaying the representations of the plurality of contactable users includes: in accordance with a determination that the first contactable user is associated with an accepted invitation to communicate with a user of the electronic device via the first communication application, displaying the representation of the first contactable user with a first value for a first visual property of the representation of the first contactable user; in accordance with a determination that the first contactable user has sent an invitation to the user of the electronic device to communicate via the first communication application that has not yet been accepted, displaying the representation of the first contactable user with the first value for the first visual property of the representation of the first contactable user; in accordance with a determination that the user of the electronic device has sent an invitation to the first contactable user to communicate via the first communication application that has not yet been accepted, displaying the representation of the first contactable user with a second value for the first visual property of the representation of the first contactable user that is different from the first value; in accordance with a determination that the second contactable user is associated with an accepted invitation to communicate with the user of the electronic device via the first communication application, displaying the representation of the second contactable user interface with the first value for a first visual property of the representation of the second contactable user; in accordance with a determination that the second contactable user has sent an invitation to the user of the electronic device to communicate via the first communication application that has not yet been accepted, displaying the representation of the second contactable user interface with the first value for the first visual property of the representation of the second contactable user; and in accordance with a determination that the user of the electronic device has sent an invitation to the first contactable user to communicate via the first communication application that has not yet been accepted, displaying the representation of the second contactable user interface with the second value for the first visual property of the representation of the second contactable user.

In accordance with some embodiments, an electronic device is described. The electronic device comprises a display device; a wireless communication radio; means for receiving a first input corresponding to a request to display a first user interface for a first communication application; and means, in response to receiving the first user input, for displaying, on the display device, the first user interface, wherein displaying the first user interface includes concurrently displaying representations of a plurality of contactable users, including a first contactable user and a second contactable user, wherein concurrently displaying the representations of the plurality of contactable users includes: in accordance with a determination that the first contactable user is associated with an accepted invitation to communicate with a user of the electronic device via the first communication application, displaying the representation of the first contactable user with a first value for a first visual property of the representation of the first contactable user; in accordance with a determination that the first contactable user has sent an invitation to the user of the electronic device to communicate via the first communication application that has not yet been accepted, displaying the representation of the first contactable user with the first value for the first visual property of the representation of the first contactable user; in accordance with a determination that the user of the electronic device has sent an invitation to the first contactable user to communicate via the first communication application that has not yet been accepted, displaying the representation of the first contactable user with a second value for the first visual property of the representation of the first contactable user that is different from the first value; in accordance with a determination that the second contactable user is associated with an accepted invitation to communicate with the user of the electronic device via the first communication application, displaying the representation of the second contactable user interface with the first value for a first visual property of the representation of the second contactable user; in accordance with a determination that the second contactable user has sent an invitation to the user of the electronic device to communicate via the first communication application that has not yet been accepted, displaying the representation of the second contactable user interface with the first value for the first visual property of the representation of the second contactable user; and in accordance with a determination that the user of the electronic device has sent an invitation to the first contactable user to communicate via the first communication application that has not yet been accepted, displaying the representation of the second contactable user interface with the second value for the first visual property of the representation of the second contactable user.

In accordance with some embodiments, a method performed at an electronic device with a display device and a wireless communication radio is described. The method comprises: displaying, via the display device, a communication user interface that includes an activatable indicator displayed with a first visual appearance; receiving a first input corresponding to the activatable indicator displayed with the first visual appearance; and in response to receiving the first input: in accordance with a determination that the first input satisfies a set of input criteria: initiating, via the wireless communication radio, a voice communication session with a second electronic device; and displaying the activatable indicator with a second visual appearance; and in accordance with a determination that the first input does not satisfy the set of input criteria, displaying the activatable indicator with a third visual appearance that is different from the second visual appearance, the third visual appearance including an indication of an input that would satisfy the set of input criteria, wherein displaying the activatable indicator with the third appearance occurs without initiating, via the wireless communication radio, a voice communication session with the second electronic device.

In accordance with some embodiments, a non-transitory computer-readable storage medium storing one or more programs configured to be executed by one or more processors of an electronic device with a display device and a wireless communication radio is described. The one or more programs including instructions for: displaying, via the display device, a communication user interface that includes an activatable indicator displayed with a first visual appearance; receiving a first input corresponding to the activatable indicator displayed with the first visual appearance; and in response to receiving the first input: in accordance with a determination that the first input satisfies a set of input criteria: initiating, via the wireless communication radio, a voice communication session with a second electronic device; and displaying the activatable indicator with a second visual appearance; and in accordance with a determination that the first input does not satisfy the set of input criteria, displaying the activatable indicator with a third visual appearance that is different from the second visual appearance, the third visual appearance including an indication of an input that would satisfy the set of input criteria, wherein displaying the activatable indicator with the third appearance occurs without initiating, via the wireless communication radio, a voice communication session with the second electronic device.

In accordance with some embodiments, a transitory computer-readable storage medium storing one or more programs configured to be executed by one or more processors of an electronic device with a display device and a wireless communication radio is described. The one or more programs including instructions for: displaying, via the display device, a communication user interface that includes an activatable indicator displayed with a first visual appearance; receiving a first input corresponding to the activatable indicator displayed with the first visual appearance; and in response to receiving the first input: in accordance with a determination that the first input satisfies a set of input criteria: initiating, via the wireless communication radio, a voice communication session with a second electronic device; and displaying the activatable indicator with a second visual appearance; and in accordance with a determination that the first input does not satisfy the set of input criteria, displaying the activatable indicator with a third visual appearance that is different from the second visual appearance, the third visual appearance including an indication of an input that would satisfy the set of input criteria, wherein displaying the activatable indicator with the third appearance occurs without initiating, via the wireless communication radio, a voice communication session with the second electronic device.

In accordance with some embodiments, an electronic device that comprises a display device; a wireless communication radio; one or more processors; and memory storing one or more programs configured to be executed by the one or more processors is described. The one or more programs including instructions for: displaying, via the display device, a communication user interface that includes an activatable indicator displayed with a first visual appearance; receiving a first input corresponding to the activatable indicator displayed with the first visual appearance; and in response to receiving the first input: in accordance with a determination that the first input satisfies a set of input criteria: initiating, via the wireless communication radio, a voice communication session with a second electronic device; and displaying the activatable indicator with a second visual appearance; and in accordance with a determination that the first input does not satisfy the set of input criteria, displaying the activatable indicator with a third visual appearance that is different from the second visual appearance, the third visual appearance including an indication of an input that would satisfy the set of input criteria, wherein displaying the activatable indicator with the third appearance occurs without initiating, via the wireless communication radio, a voice communication session with the second electronic device.

In accordance with some embodiments, an electronic device is described. The electronic device comprises a display device; a wireless communication radio; means for displaying, via the display device, a communication user interface that includes an activatable indicator displayed with a first visual appearance; means for receiving a first input corresponding to the activatable indicator displayed with the first visual appearance; and means, in response to receiving the first input, for: in accordance with a determination that the first input satisfies a set of input criteria: initiating, via the wireless communication radio, a voice communication session with a second electronic device; and displaying the activatable indicator with a second visual appearance; and in accordance with a determination that the first input does not satisfy the set of input criteria, displaying the activatable indicator with a third visual appearance that is different from the second visual appearance, the third visual appearance including an indication of an input that would satisfy the set of input criteria, wherein displaying the activatable indicator with the third appearance occurs without initiating, via the wireless communication radio, a voice communication session with the second electronic device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing electronic voice communications, thereby increasing the effectiveness, efficiency, and user satisfaction with such devices. Such methods and interfaces may complement or replace other methods for managing electronic voice communications.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 1B is a block diagram illustrating exemplary components for event handling in accordance with some embodiments.

FIGS. 7A-7D are a flow diagram illustrating a method for managing user contacts for electronic voice communications using an electronic device, in accordance with some embodiments.

FIGS. 8A-8C are a flow diagram illustrating a method for managing incoming and outgoing electronic voice communications using an electronic device, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing electronic voice communications. Current techniques may require additional user inputs that necessitates additional operations by the electronic device, thus leading to the electronic device consuming more battery power. Such techniques can reduce the cognitive burden on a user who access electronic voice communications, thereby enhancing productivity. Further, such techniques can reduce processor and battery power otherwise wasted on redundant user inputs.

Figure 8A:
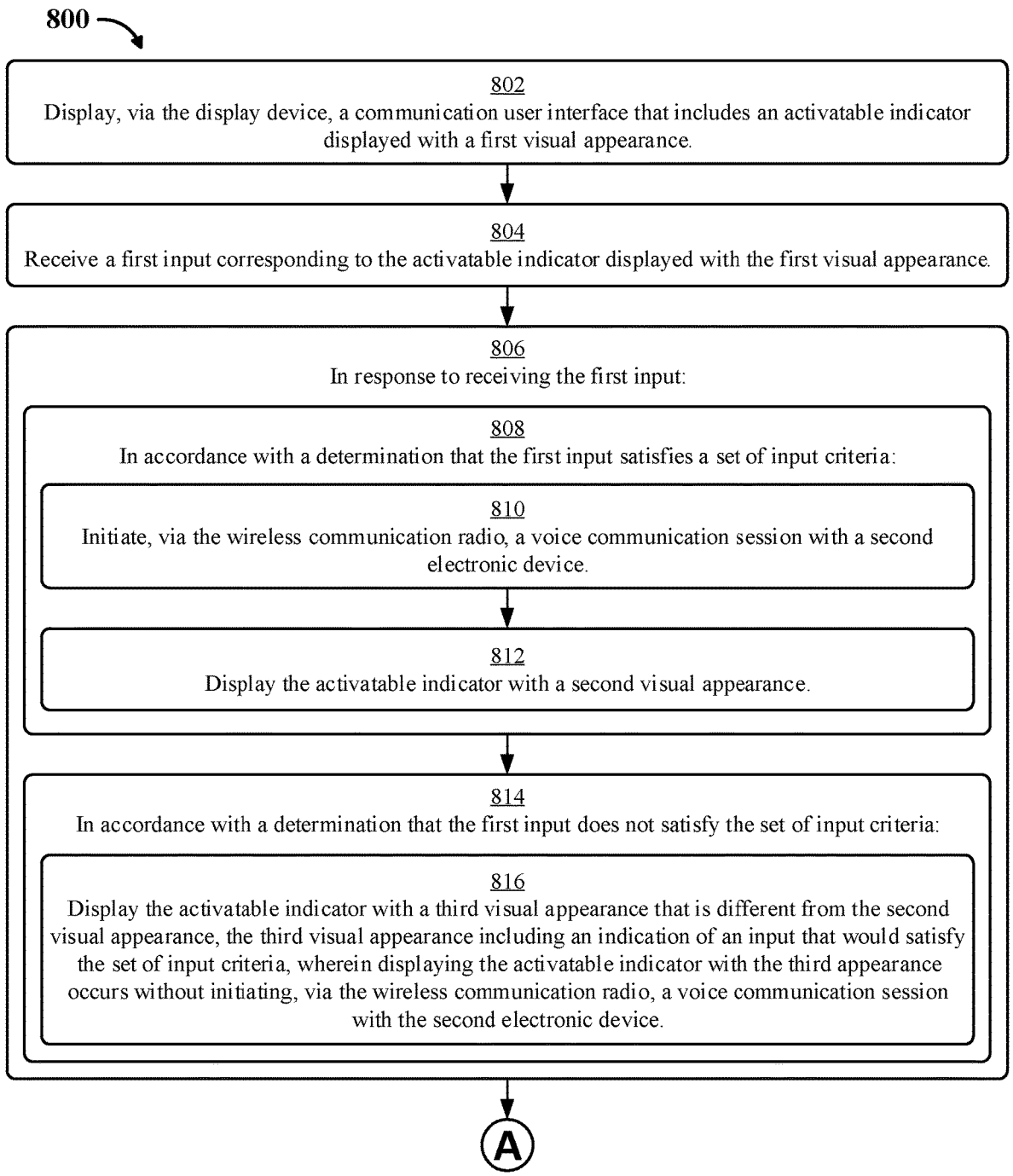

Below, FIGS. 1A-1B, 2, 3, 4A-4B, and 5A-5H provide a description of exemplary devices for performing the techniques for managing electronic voice communications. FIGS. 6A-6S illustrate exemplary user interfaces for managing electronic voice communications using an electronic device, in accordance with some embodiments. FIGS. 7A-7D are a flow diagram illustrating a method for managing user contacts for electronic voice communications using an electronic device, in accordance with some embodiments. FIGS. 8A-8C are a flow diagram illustrating a method for managing incoming and outgoing electronic voice communications using an electronic device, in accordance with some embodiments. The user interfaces in FIGS. 6A-6S are used to illustrate the processes described below, including the processes in FIGS. 7A-7D and 8A-8C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
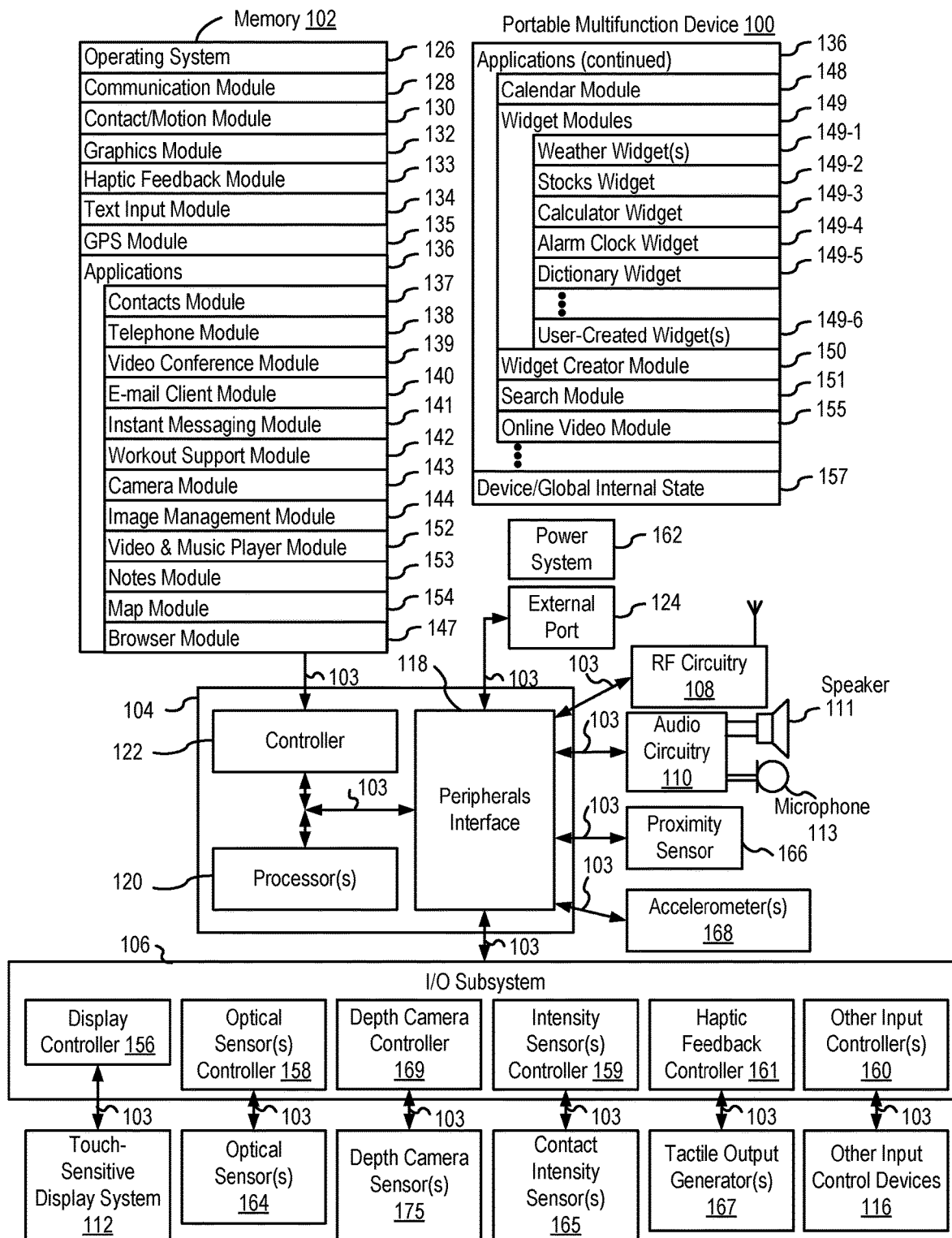
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
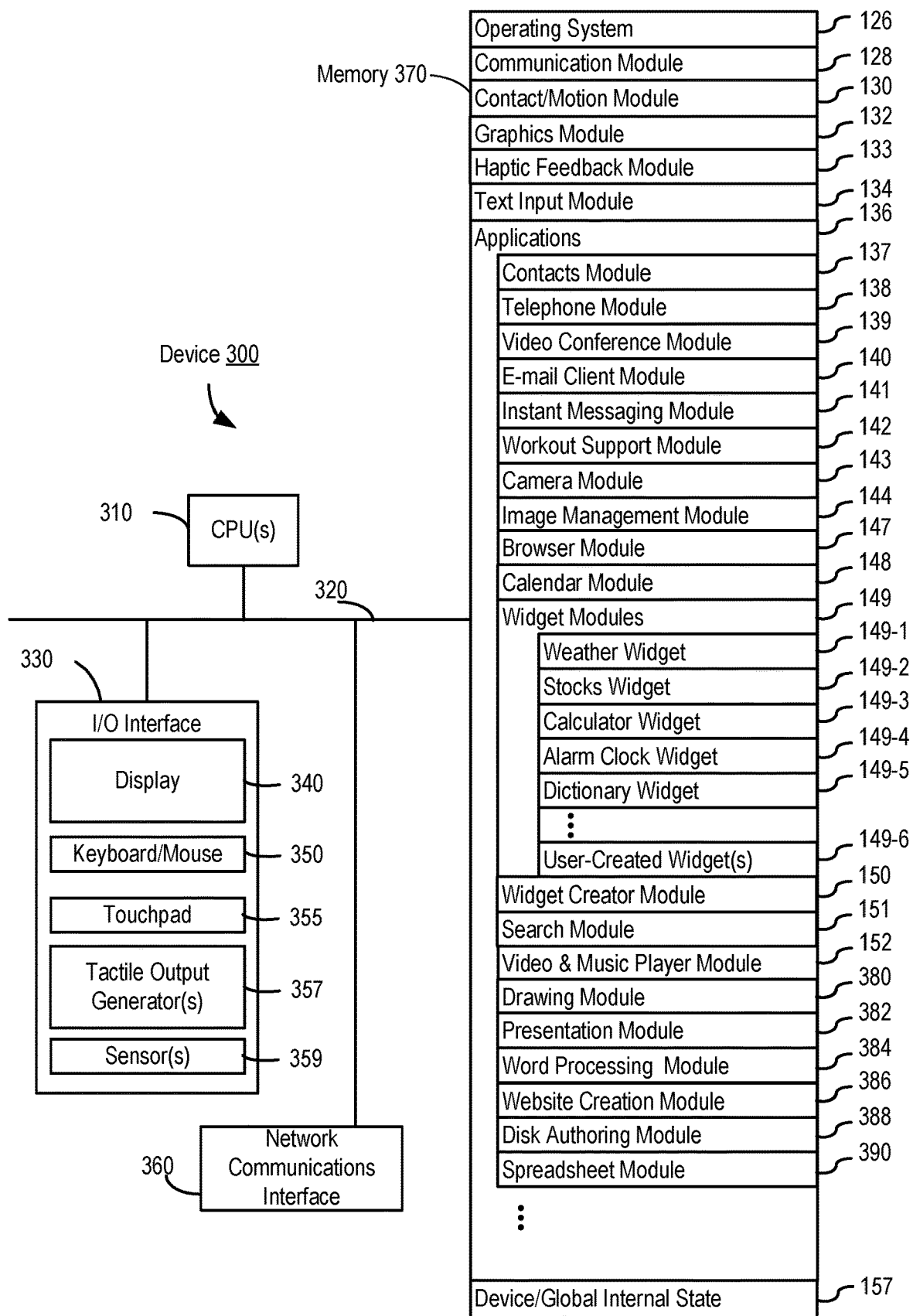
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
 Telephone module 138;
 Video conference module 139;
 E-mail client module 140;
 Instant messaging (IM) module 141;
 Workout support module 142;
 Camera module 143 for still and/or video images;
 Image management module 144;
 Video player module;
 Music player module;
 Browser module 147;
 Calendar module 148;
 Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 Widget creator module 150 for making user-created widgets 149-6;
 Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
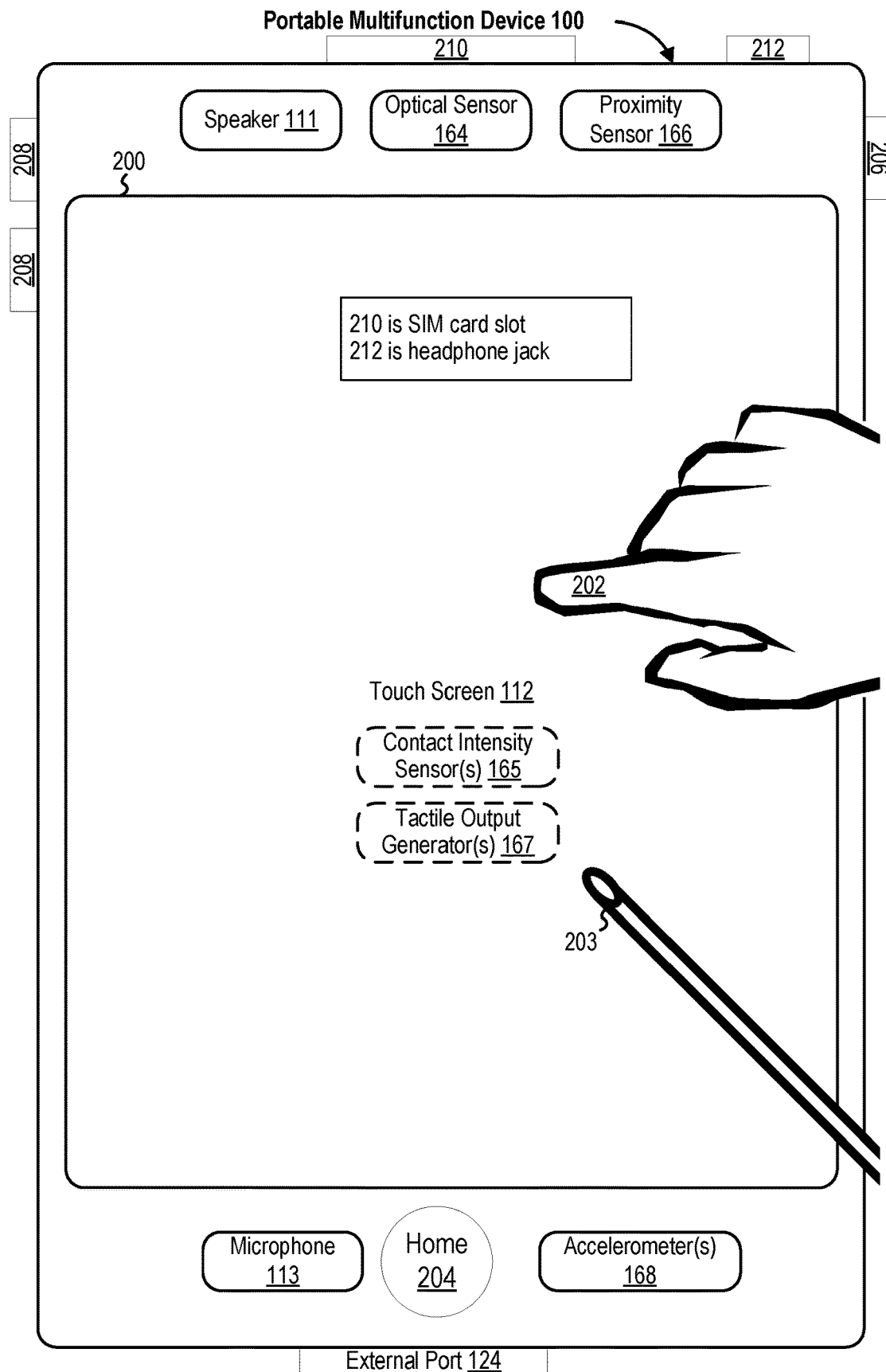
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
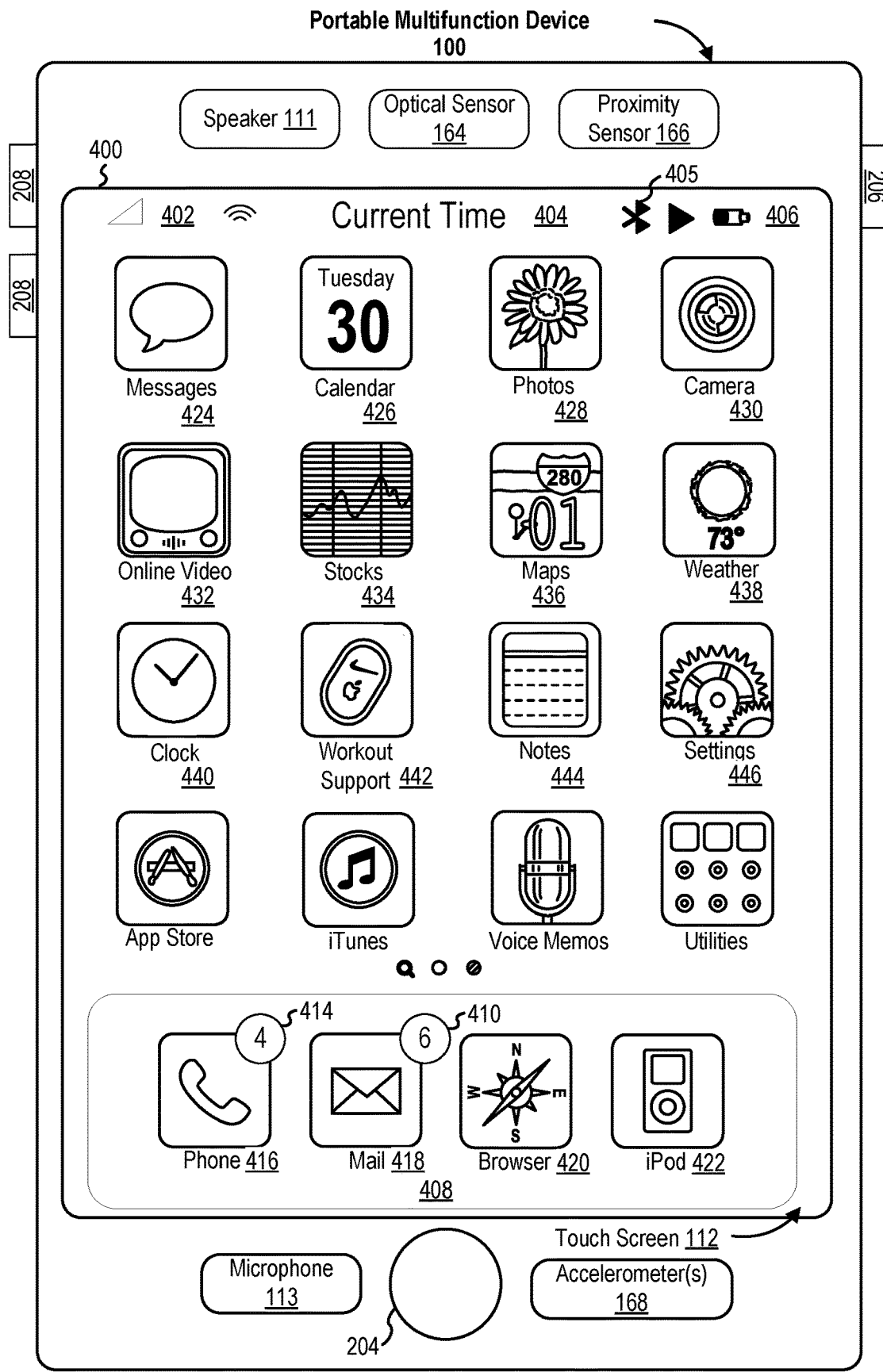
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
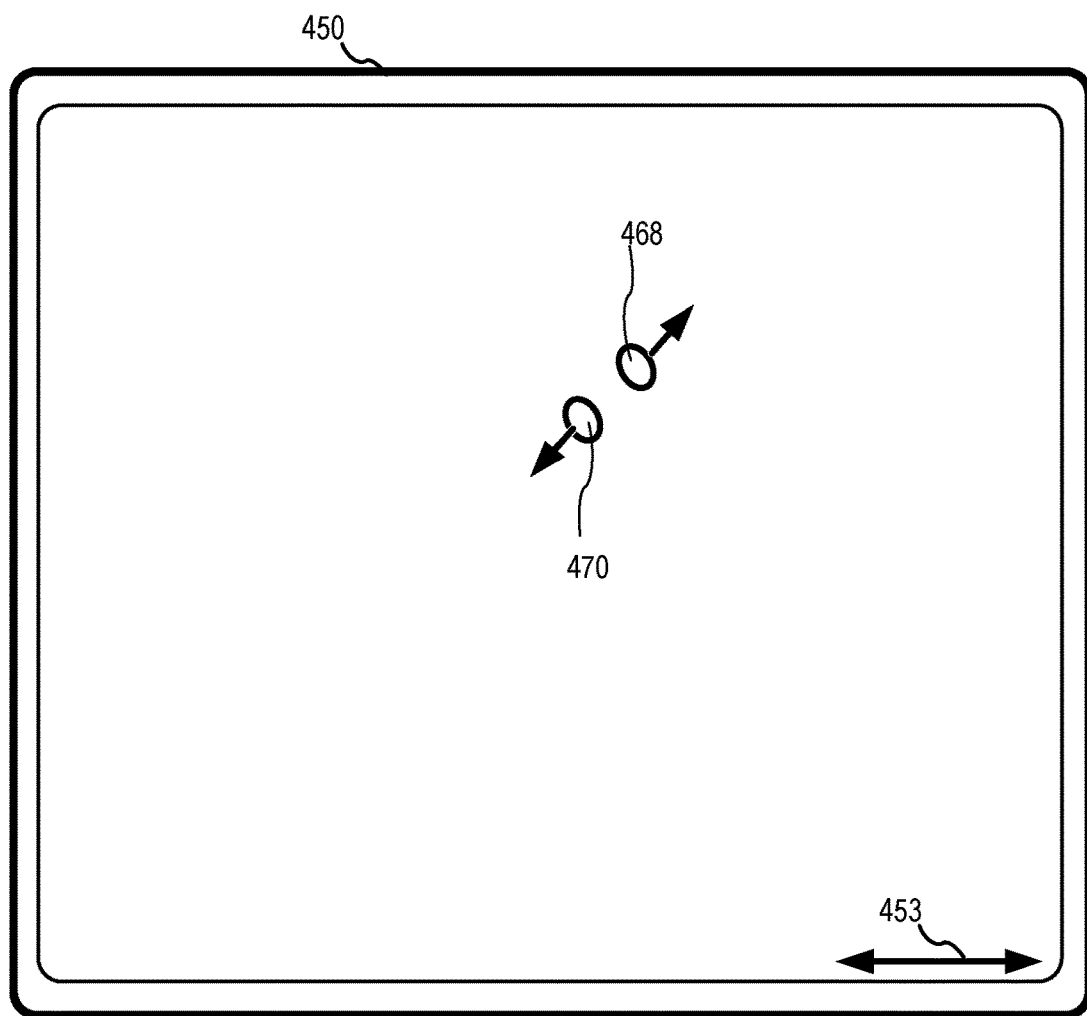
FIG. 4B illustrates an exemplary user interface for a multifunction device with a touch-sensitive surface that is separate from the display in accordance with some embodiments.
Figure 4B:
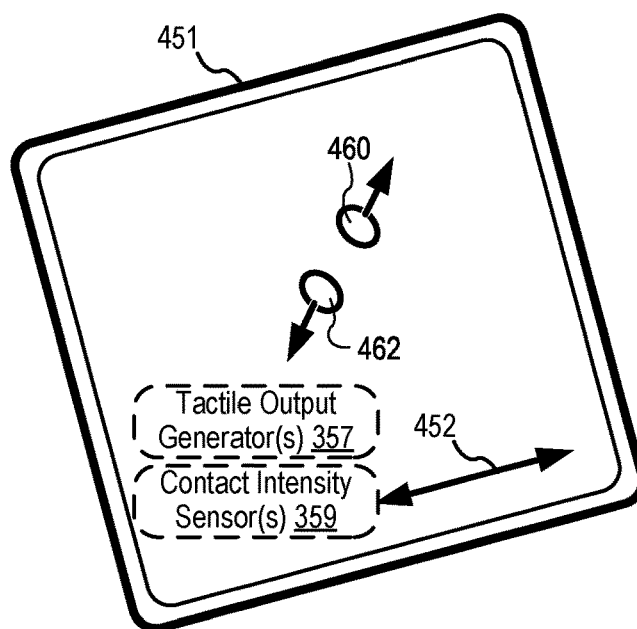

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
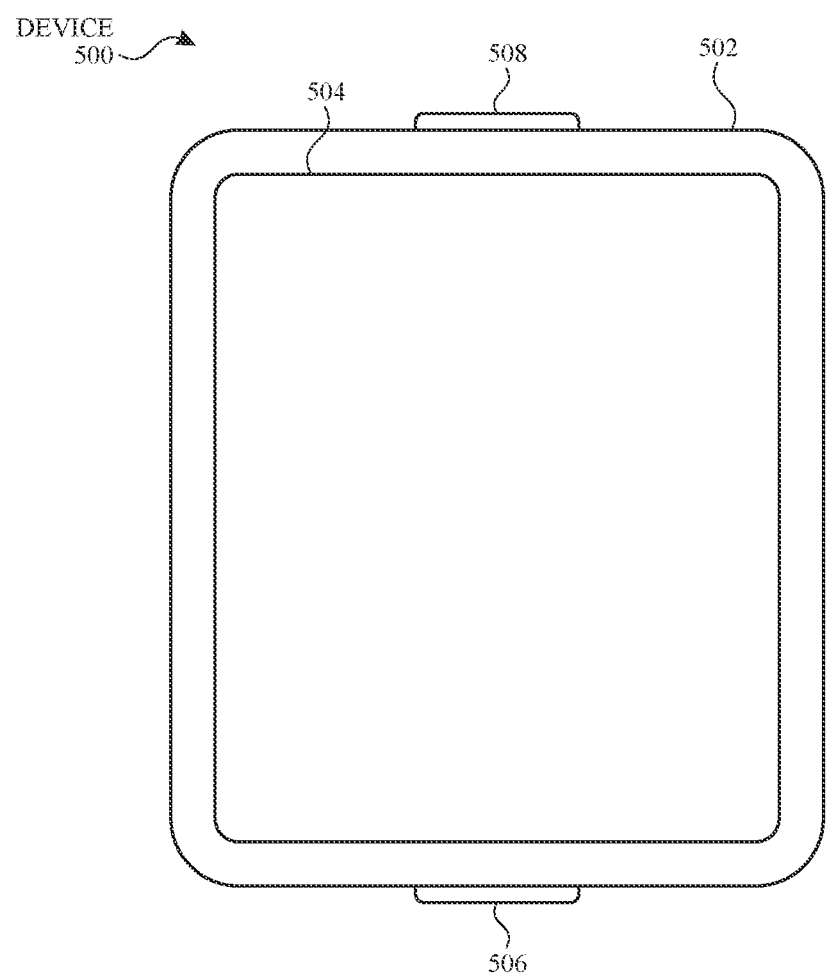
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
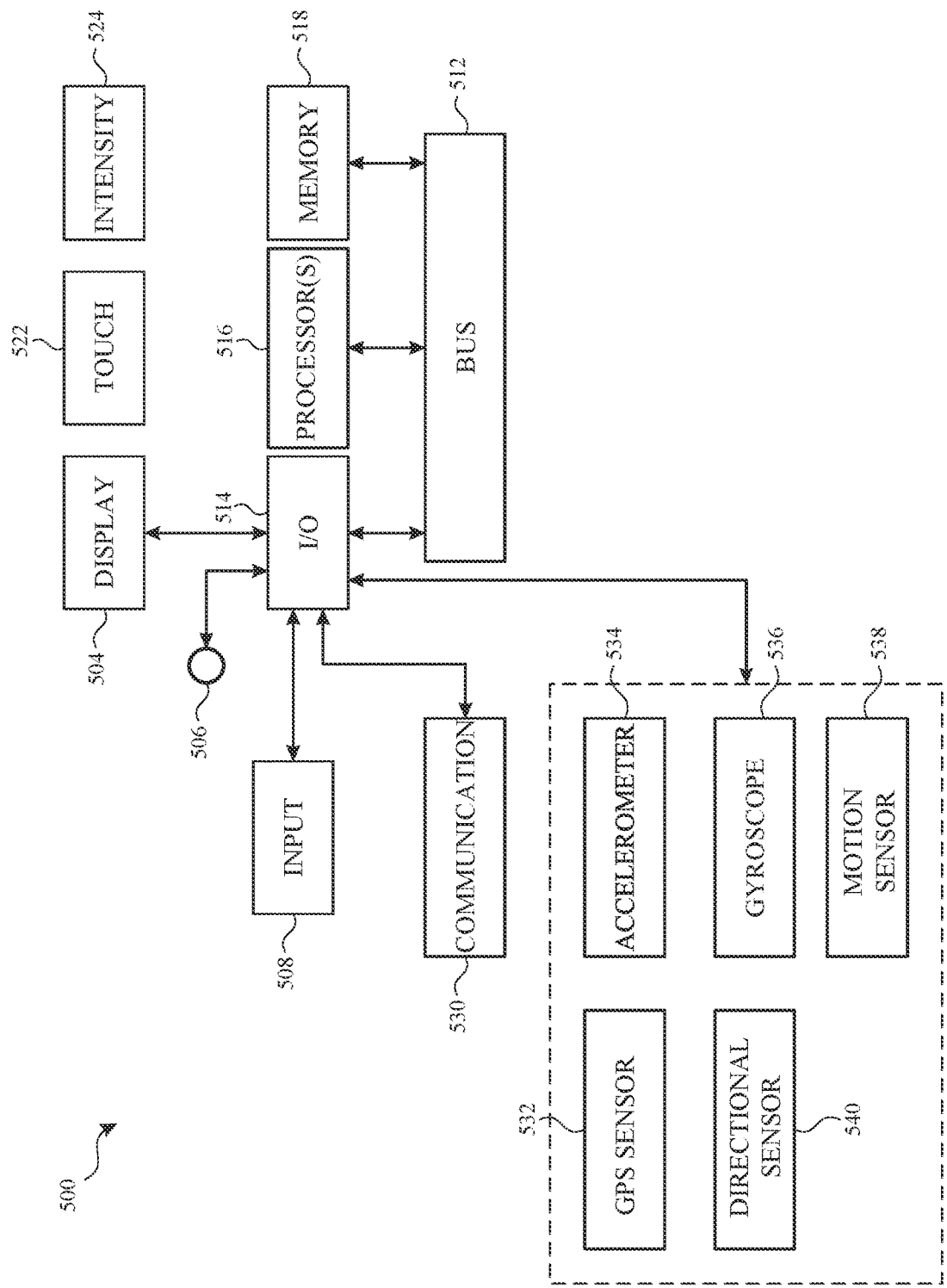
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 800 (FIGS. 7A-7D and 8A-8C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
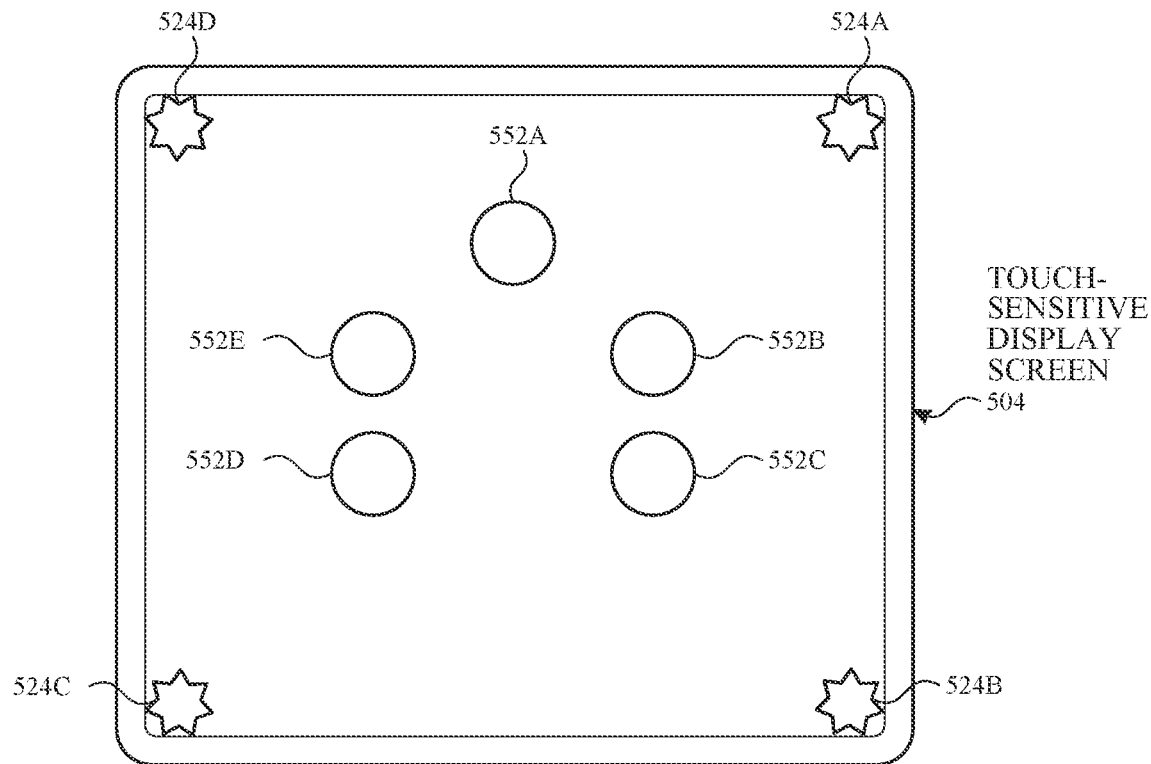
FIGS. 5C-5D illustrate exemplary components of a personal electronic device having a touch-sensitive display and intensity sensors in accordance with some embodiments.
Figure 5C:
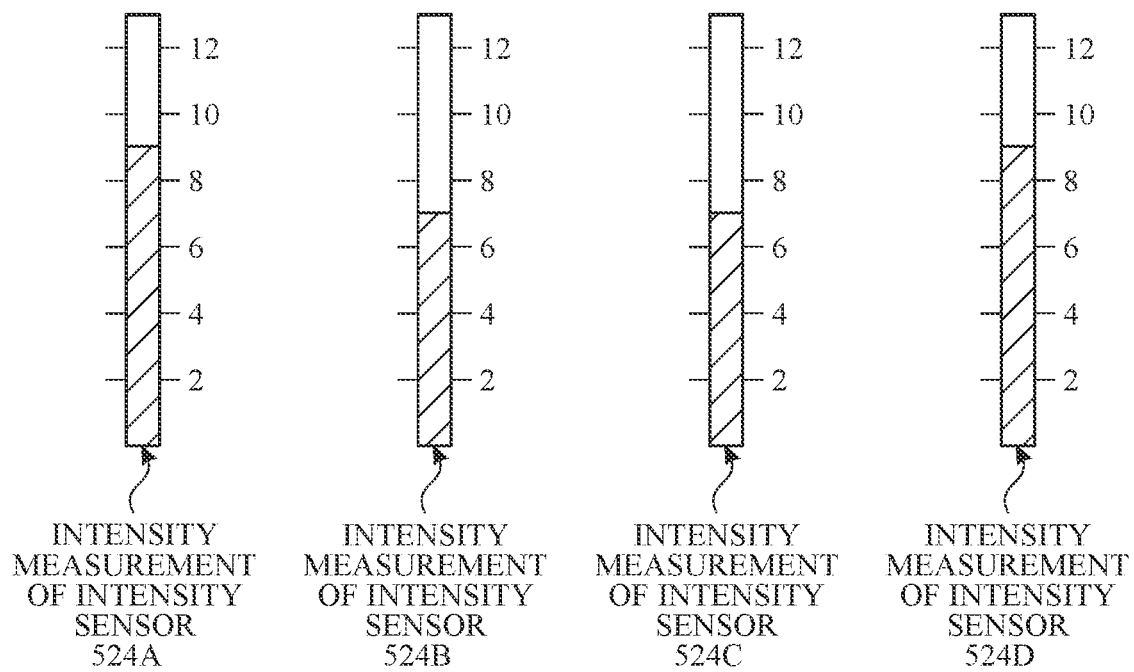
Figure 5D:
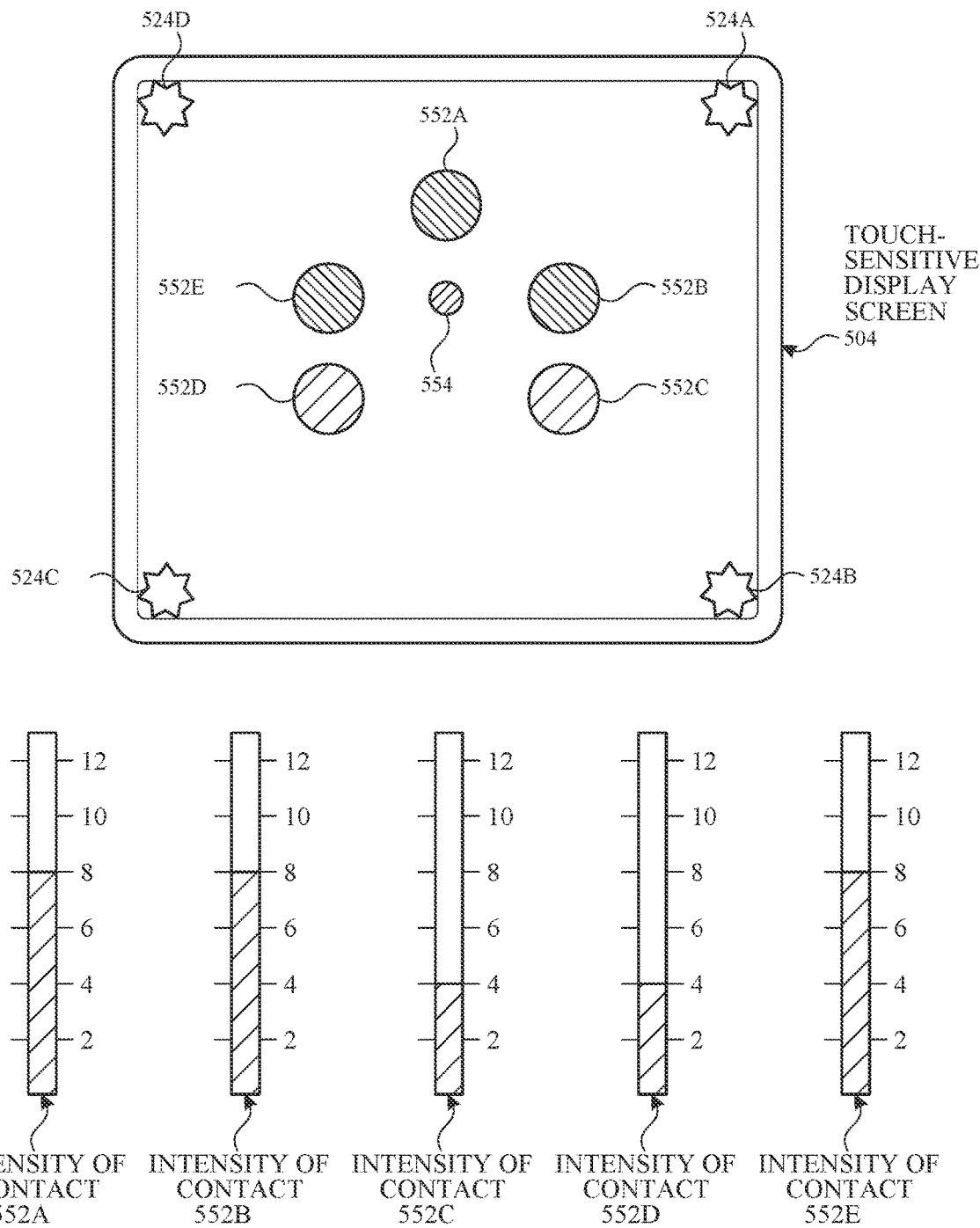

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
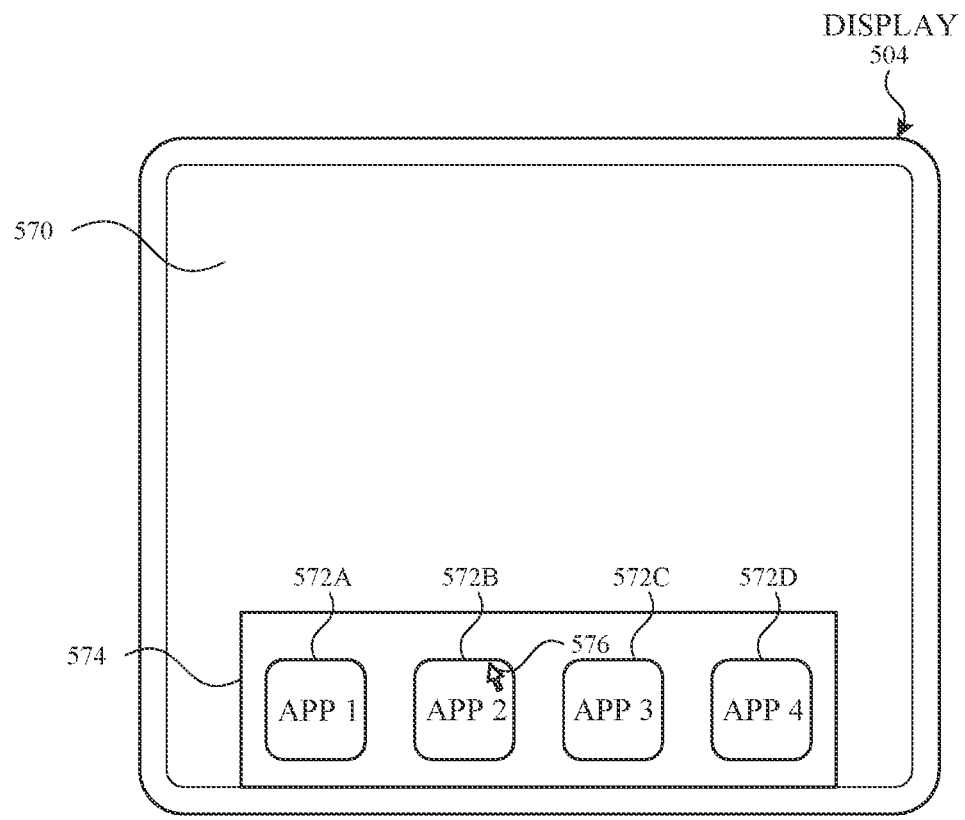
FIGS. 5E-5H illustrate exemplary components and user interfaces of a personal electronic device in accordance with some embodiments.
Figure 5E:
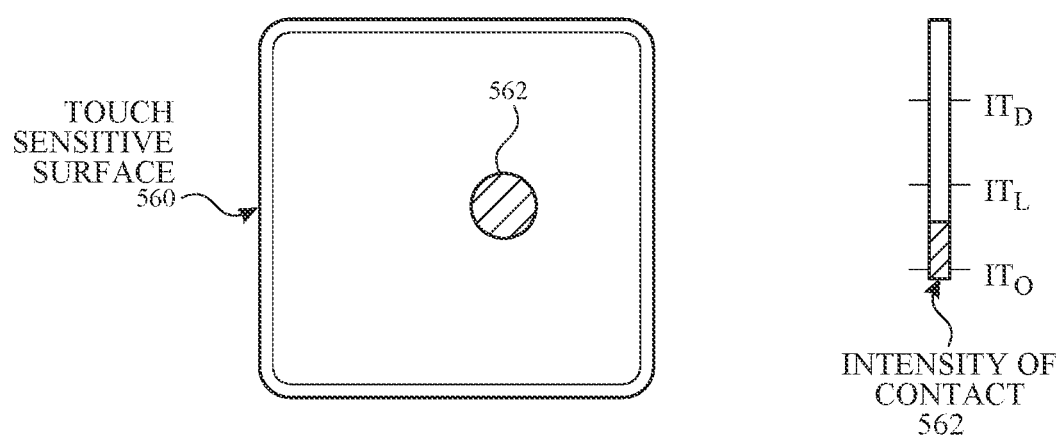
Figure 5F:
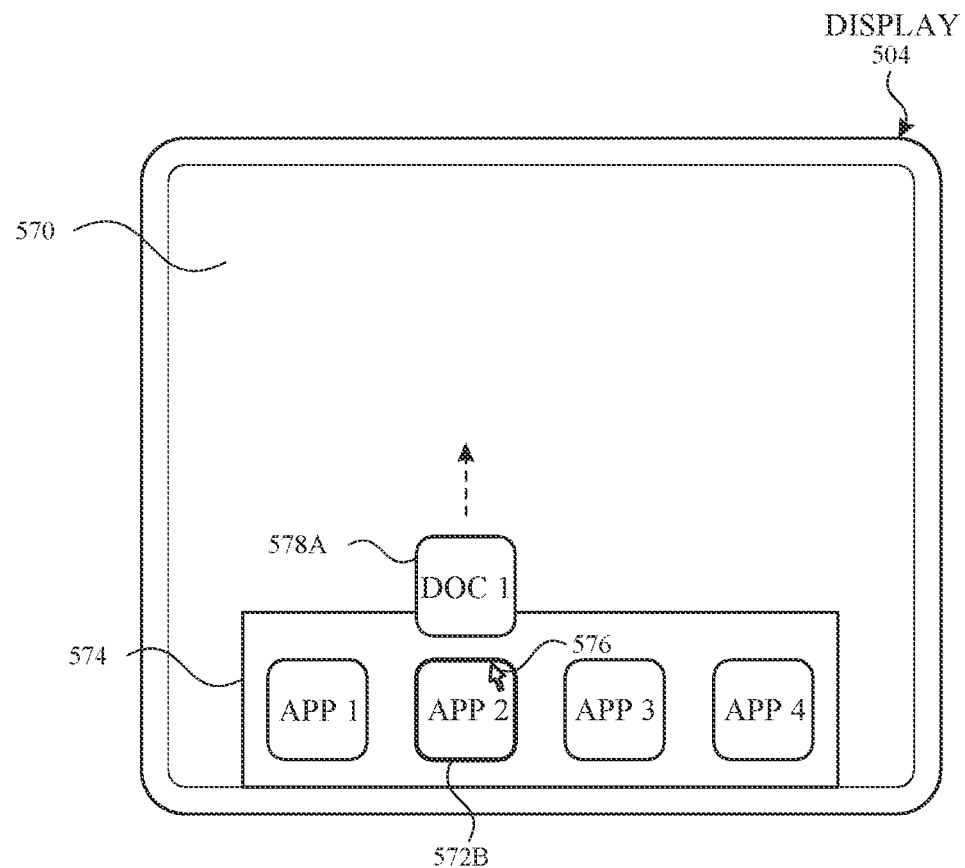
Figure 5F:
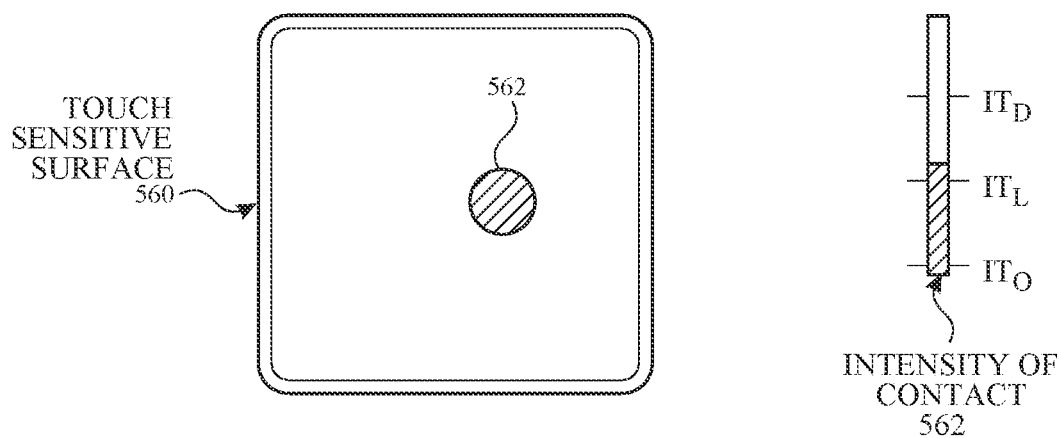
Figure 5G:
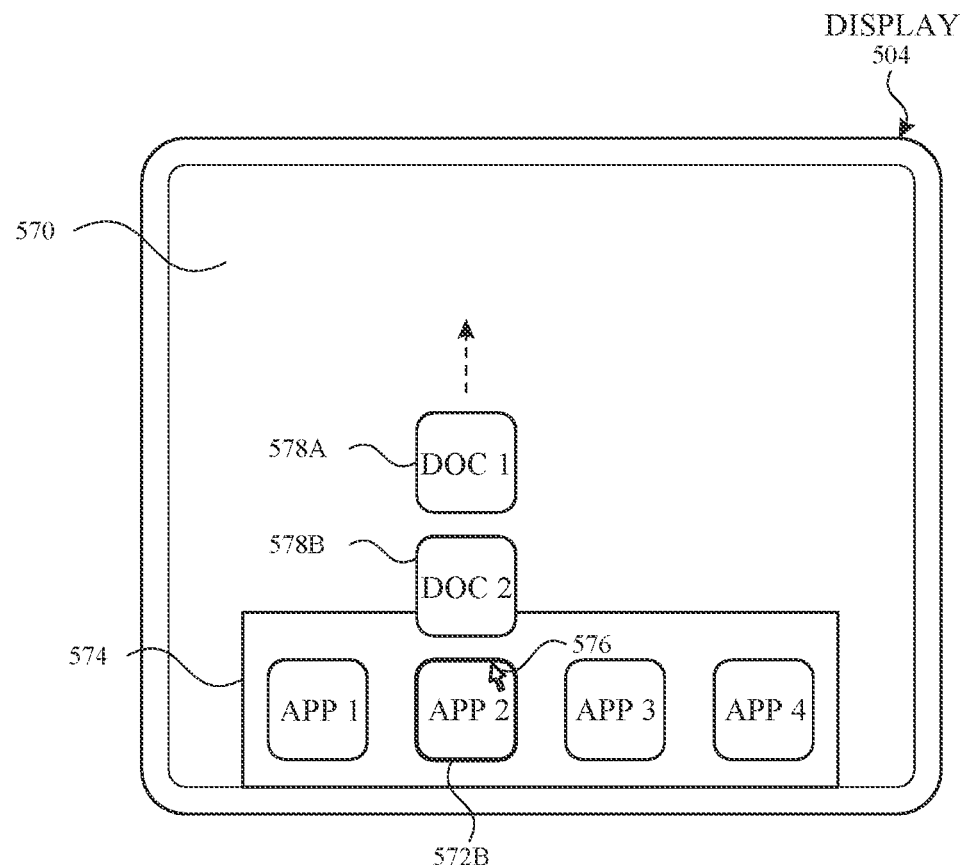
Figure 5G:
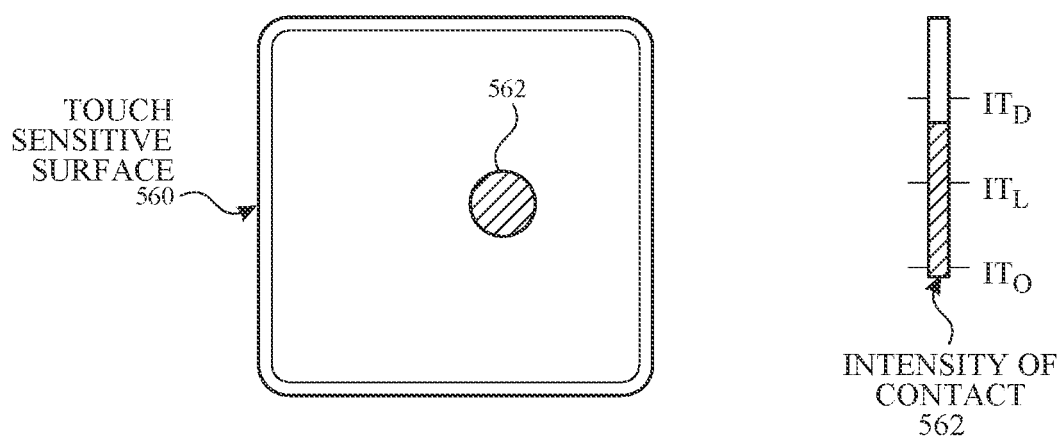
Figure 5H:
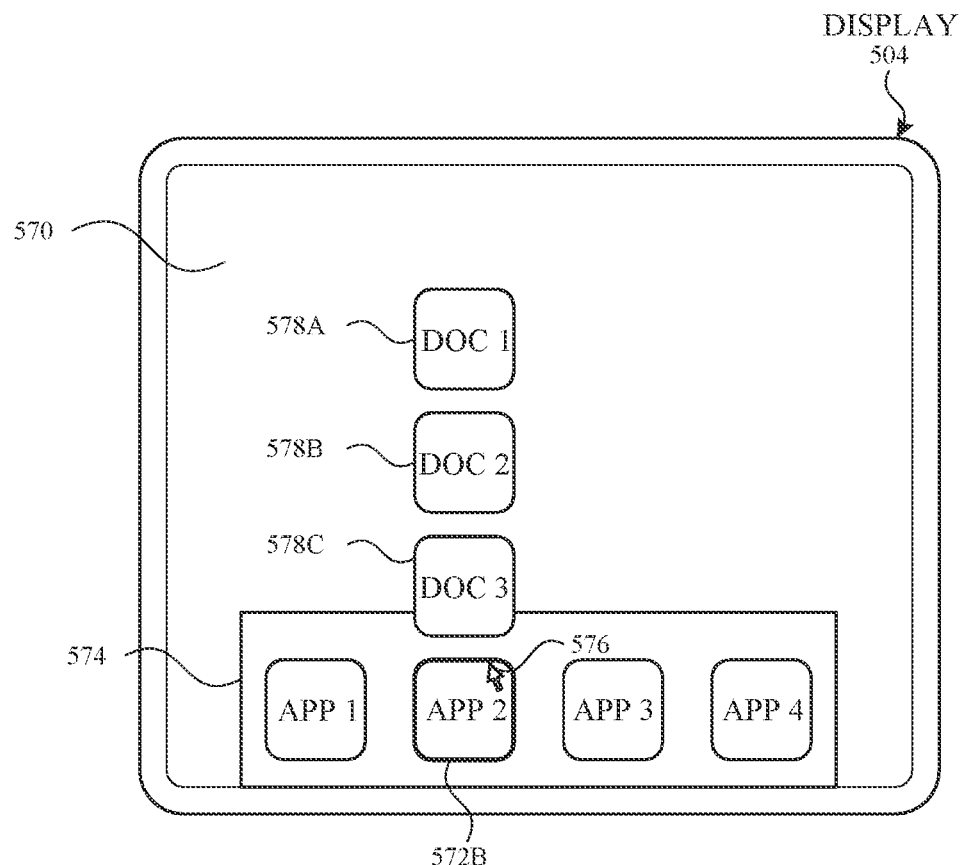
Figure 5H:
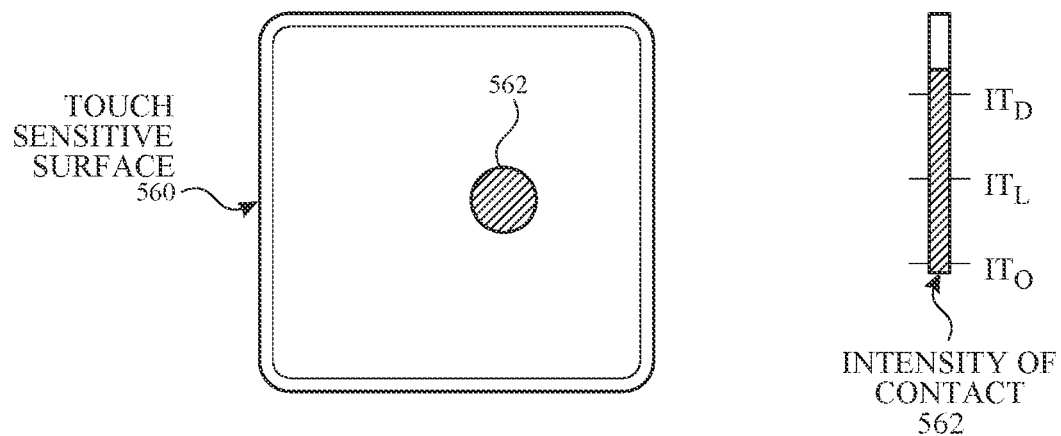

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6S illustrate exemplary user interfaces for managing electronic voice communications using an electronic device, in accordance with some embodiments. In some embodiments, the electronic device is similar to portable multifunction device 100, device 300, and/or device 500 described above. The user interfaces in these figures are used to illustrate the processes described below, including the processes in FIGS. 7 and 8.

FIG. 6A illustrates an electronic device 600 (e.g., a smartwatch; a smartphone) with a display device 112 and a wireless communication radio (e.g., for LTE, WiFi, and/or Bluetooth connections).

In FIG. 6A, electronic device 600 displays, on display device 112, a user contacts (e.g., contactable user) user interface 602 of a voice communication application (e.g., an asynchronous voice (e.g., half-duplex) communication application; a voice-based chat application; a voice communication application; a talk application). In some embodiments, user contacts user interface 602 of the voice communication application includes a selectable user interface element 604 (e.g., an on-off toggle button; an affordance) for activating (e.g., enabling; allowing; turning on) or deactivating (e.g., disabling; disallowing; turning off) electronic voice communications via the voice communication application on electronic device 600. In some embodiments, selectable user interface element 604 indicates whether electronic voice communications are activated (e.g., with the on-off toggle being in an on position) or deactivated (e.g., with the on-off toggle being in an off position) on electronic device 600.

In some embodiments, when electronic voice communications are activated on electronic device 600, electronic device 600 plays or causes an output of (e.g., automatically, without further user input), using one or more output devices (e.g., one or more speakers of electronic device 600; an audio output device, such as an earphone or headphone, connected to, linked to, and/or in communication with electronic device 600) a received voice message corresponding to an incoming electronic voice communication (e.g., an incoming recorded voice message) sent via a corresponding voice communication application on a second electronic device (e.g., a different smartwatch; a different smartphone). In some embodiments, when electronic voice communications are deactivated on electronic device 600, electronic device 600 forgoes playing or causing an output of the received voice message corresponding to the incoming electronic voice communication (e.g., the incoming voice message). In some embodiments, when electronic voice communications are deactivated on electronic device 600, electronic device 600 stores the voice message corresponding to the incoming electronic communication (e.g., the incoming voice message) such that it can be played at a later time (e.g., when electronic voice communications are activated on electronic device 600).

As also shown in FIG. 6A, in some embodiments, user contacts user interface 602 includes an approved user contacts region 606 (e.g., a friends list; a contactable users list) that includes one or more representations of user contacts that are approved for electronic voice communications (e.g., approved to send outgoing voice message to and approved to receive incoming voice messages from) via the voice communication application. In some embodiments, users listed in contacts region 606 have both approved the user of device 600 (e.g., a user account associated with device 600) and been approved by the user of device 600 to communicate via the application associated with interface 602. In this example, approved user contacts region 606 includes a representation of an approved user contact 606A (in this example, user contact John) and a representation of an approved user contact 606B (in this example, user contact Jane), thus indicating that there are two user contacts (in this example, user contacts John and Jane) to which electronic voice communications can be sent and received via the voice communication application on electronic device 600.

As also shown in FIG. 6A, in some embodiments, user contacts user interface 602 includes a received invitations region 608 (e.g., a received invitation list) that includes one or more representations of invitations corresponding to user contacts from which an invitation to be approved for and/or engage in electronic voice communications (e.g., voice messages) via the voice communication application has been received (e.g., an electronic message or notification corresponding to the invitation has been received from the respective user contact), but not yet approved by a user of electronics device 600. In this example, received invitations region 608 includes a representation of a received invitation 610 (in this example, from user contact Tom) and a representation of a received invitation 612 (in this example, from user contact Adam), thus indicating that there are two user contacts (in this example, user contacts Tom and Adam) from which invitations requesting participation in electronic voice communications (e.g., voice messages) via the voice communication application has been received by the user of electronic device 600. In some embodiments, issuing an invitation constitutes authorization to communicate via the communication application of interface 602. Consequently, voice communication can be initiated by the user of device 600, as initiation of a voice communication constitutes authorization.

In some embodiments, a representation of a received invitation includes an accept affordance (e.g., accept affordance 610A of representation of a received invitation 610 and accept affordance 612A of representation of a received invitation 612) that, when activated, approves (e.g., enables; allows) the respective user contact to engage in sending and receiving (e.g., approved to send outgoing voice message to and receive incoming voice messages from) electronic voice communications via the voice communication application on electronic device 600, and thus causes electronics device 600 to display a corresponding representation an approved user contact for the respective user contact in approved user contacts region 606. In some embodiments, a representation of a received invitation includes a decline affordance (e.g., decline affordance 610B of representation of a received invitation 610 and decline affordance 612B of representation of a received invitation 612) that, when activated, forgoes approving (e.g., disallows; blocks) the respective user contact from engaging in sending or receiving electronic voice communications via the voice communication application on electronic device 600.

As also shown in FIG. 6A, in some embodiments, user contacts user interface 602 includes an invited user contacts region 614 (e.g., an invited friends list; an invited users list) that includes one or more representations of invited user contacts that have been invited (e.g., an electronic message or notification corresponding to an invitation has been sent to a respective recipient user contact), but not yet approved by the respective invited user contact, for electronic voice communications via the voice communication application. In this example, invited user contacts region 614 includes a representation of an invited user contact 614A (in this example, user contact Annie) and a representation of an invited user contact 614B (in this example, user contact Emma), thus indicating that there are two invited user contacts (in this example, user contacts Annie and Emma) to which invitations requesting approval for electronic voice communications (e.g., voice messages) via the voice communication application have been sent. In some embodiments, representations of invited user contacts in invited user contacts region 614 are displayed with a visual characteristic (e.g., a shading; a greyed color; a darkened color) that further indicates (e.g., emphasizes) that the respective invited user contacts (in this example, user contacts Annie and Emma) have not accepted their respective invitations. In some embodiments, because invited users have not accepted the invitation, the user of device 600 cannot initiate a voice communication via the application of interface 602, as two-way authorization is required.

As also shown in FIG. 6A, in some embodiments, user contacts user interface 602 includes an add user contact affordance 616 for selecting one or more new user contacts (e.g., from an existing friends list or users list) to which invitations requesting participation in electronic voice communications (e.g., voice messages) via the voice communication application are to be sent.

In FIG. 6A, electronic voice communications via the voice communication application on electronic device 600 are deactivated (e.g., as indicated by selectable user interface element 604 being in a deactivated (e.g., disabled; off) position or state). In some embodiments, when electronic voice communications via the voice communication application on electronic device 600 are deactivated, electronic device 600 displays user contacts user interface 602 with a visual characteristic (e.g., a darkened state; a greyed-out state; a particular background color) that indicates that electronic voice communications via the voice communication application on electronic device 600 are deactivated.

In FIG. 6A, while displaying user contacts user interface 602 of the voice communication application with electronic voice communications via the voice communication application deactivated, electronic device 600 detects, via display device 112, an input 601 directed to selectable user interface element 604.

In FIG. 6B, in response to detecting input 601 directed to selectable user interface element 604, electronic device 600 activates (e.g., enables; allows) electronic voice communications via the voice communication application on electronic device 600, and indicates, via selectable user interface element 604, that electronic voice communications via the voice communication application have been activated on electronic device 600. In some embodiments, electronic device 600 also ceases displaying the visual characteristic (e.g., the darkened state; the greyed-out state; the particular background color) of FIG. 6A, thereby further indicating that electronic voice communications via the voice communication application are now activated (e.g., enabled; allowed) on electronic device 600.

In FIG. 6B, after electronic voice communications via the voice communication application has been activated on electronic device 600, electronic device 600 detects, via display device 112, an activation 603 of (e.g., a selection of; a tap input on; a tap gesture directed to) accept affordance 612A of representation of a received invitation 612 (in this example, corresponding to user contact Adam).

Figure 6C:
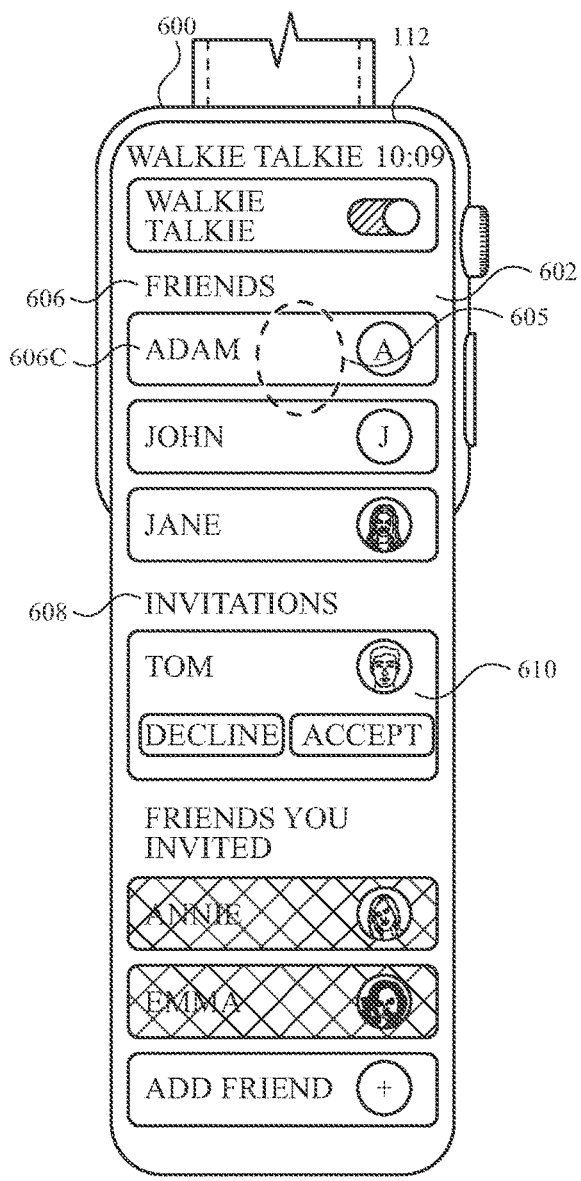
FIGS. 6A-6S illustrate exemplary user interfaces for managing electronic voice communications using an electronic device, in accordance with some embodiments.

In FIG. 6C, in response to detecting activation 603 of accept affordance 612A of representation of a received invitation 612 (in this example, corresponding to user contact Adam), electronic device 600 approves, via the voice communication application, the respective user contact of representation of a received invitation 612 (in this example, user contact Adam) for electronic voice communications via the voice communication application on electronic device 600. Further in response to detecting activation 603 of accept affordance 612A of representation of a received invitation 612, electronic device 600 ceases display of, in received invitations region 608, representation of a received invitation 612 and displays, in approved user contacts region 606, a representation of an approved user contact 606C corresponding to the respective user contact of representation of a received invitation 612 in FIG. 6B (in this example, user contact Adam).

In FIG. 6C, after displaying, in approved user contacts region 606 of user contacts user interface 602, representation of a user contact 606C corresponding to the respective user contact of representation of a received invitation 612 in FIG. 6B (in this example, user contact Adam), electronic device 600 detects, via display device 112, an activation 605 of (e.g., a selection of; a tap input on; a tap gesture directed to) representation of an approved user contact 606C.

Figure 6D:
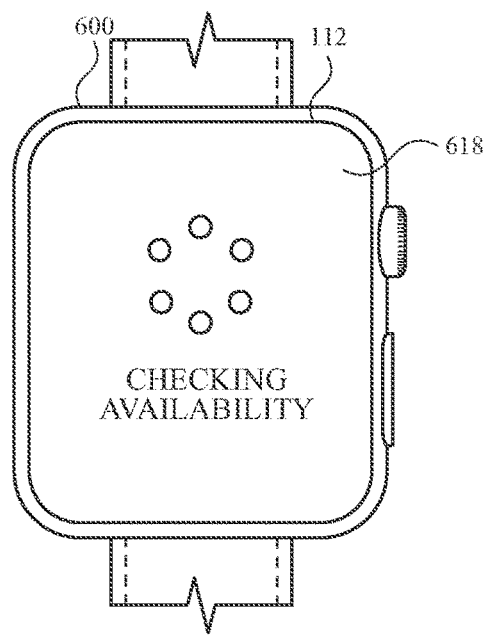

In FIG. 6D, in response to detecting activation 605 of representation of an approved user contact 606C (in this example, user contact Adam), electronic device 600 displays, on display device 112, a checking availability user interface 618 indicating that the respective user contact's (in this example, user contact Adam's) availability to engage in electronic voice communications via the voice communication application is being determined.

In some embodiments, in accordance with a determination that the respective user contact (in this example, user contact Adam) is unavailable, electronic device 600 displays an indication (e.g., a message; a notification) that the respective user contact is unavailable to (e.g., currently, at this time) participate in electronic voice communications via the voice communication application. In some embodiments, in accordance with a determination that the respective user contact (in this example, user contact Adam) is available to participate in electronic voice communications, electronic device 600 displays a communication user interface 620 of the voice communication application, which is described in greater detail below with reference to FIGS. 6E-6N.

Figure 6E:
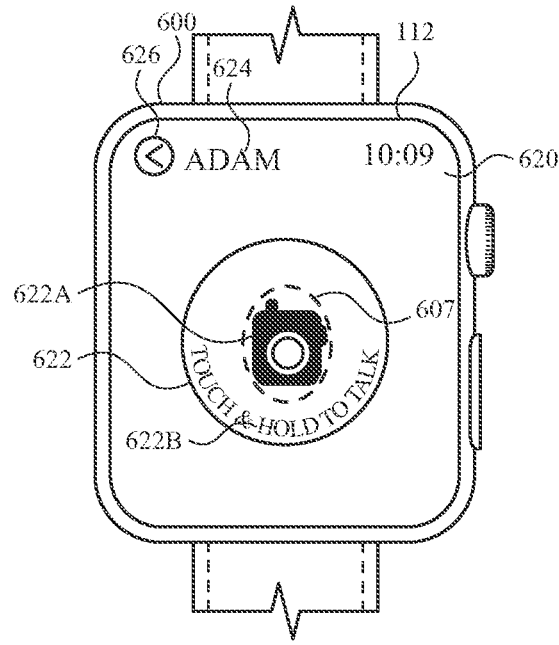

FIG. 6E illustrates electronic device 600 displaying, on display device 112, communication user interface 620 of the voice communication application in a neutral mode (e.g., a mode corresponding to when sending or receiving of electronic voice commutations via the voice communication application is not being activated on electronic device 600).

In some embodiments, communication user interface 620 includes an activatable communication object 622 for initiating and recording and/or transmitting (e.g., immediately)

a voice message for an outgoing electronic voice communication (e.g., causing a recording of an outgoing voice message and a transmittal of an electronic voice communication corresponding to the outgoing voice message). In some embodiments, communication user interface 620 also includes an indication 624 of the respective user contact (in this example, user contact Adam) corresponding to the participant of the current communication session (e.g., the other party of the current communication session). In some embodiments, communication user interface 620 also includes a user contacts affordance 626 for returning to user contacts user interface 602, as first described above with reference to FIG. 6A.

In some embodiments, in the neutral mode, electronic device 600 displays, in activatable communication object 622 of communication user interface 620, a graphical indication 622A (e.g., a graphical representation or image of a voice communication device, such as a walkie talkie) indicating that activatable communication object 622 can be used to initiate and record a voice message for an outgoing electronic voice communication.

In some embodiments, electronic device 600 requires a particular type of input (e.g., a touch and hold or press and hold input that is maintained for at least a predetermined activation time period) directed to activatable communication object 622 of communication user interface 620 in order to successfully initiate an outgoing electronic voice communication. In some embodiments, in the neutral mode, electronic device 600 displays, in activatable communication object 622 of communication user interface 620, a first text indication 622B that includes instructions (e.g., stating "Touch and Hold to Talk") for activating activatable communication object 622 to send an outgoing electronic voice communication, where the instructions are displayed with a first visual characteristic (e.g., a first text size; a first font; a first displayed region (e.g., a peripheral region of activatable communication object 622)). In some embodiments, in the neutral mode, electronic device 600 displays activatable communication object 622 with a first visual characteristic (e.g., a first color (e.g., a neutral mode color, such as yellow)). In some embodiments, in the neutral mode, electronic device 600 displays activatable communication object 622 with the first color (e.g., yellow) as the background color for activatable communication object 622. In some embodiments, the first color (e.g., yellow) is used, thematically, throughout the application to indicate that a voice communication is available for activation, but is not currently activated.

In FIG. 6E, while displaying communication user interface 620 in the neutral mode, electronic device 600 detects, via display device 112, an input 607 (e.g., a touch input or touch gesture that is not maintained for at least the predetermined activation time period) directed to activatable communication object 622, where input 607 does not correspond to the particular type of input required to successfully initiate an outgoing electronic voice communication.

Figure 6F:
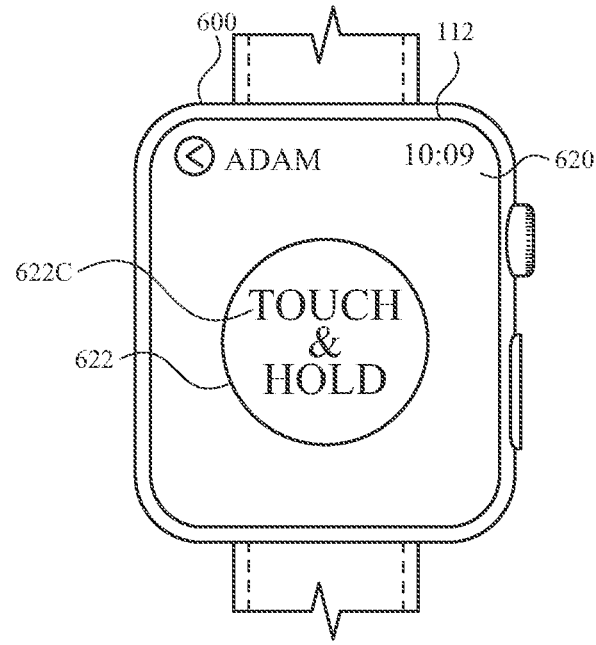

In FIG. 6F, in response to detecting input 607 directed to activatable communication object 622 of communication user interface 620, where, as mentioned, input 607 does not correspond to the particular type of input (e.g., a touch and hold or press and hold input that is maintained for at least a predetermined activation time period) required to successfully initiate an outgoing electronic voice communication, electronic device 600 displays, in activatable communication object 622, a second text indication 622C that includes instructions (e.g., stating "Touch and Hold") for activating activatable communication object 622 to send a voice message for an outgoing electronic voice communication, where the instructions are displayed with a second visual characteristic (e.g., a second text size that is larger than the first text size; a second font that is different from the first font; a second displayed (e.g., a center region of activatable communication object 622)). In some embodiments, electronic device 600 also ceases displaying, in activatable communication object 622, graphical indication 622A and first text indication 622B while displaying second text indication 622C. In some embodiments, object 622 also includes a visual characteristic having the first color (e.g., yellow) to indicate that a voice communication is available for activation, but is not currently activated.

Figure 6G:
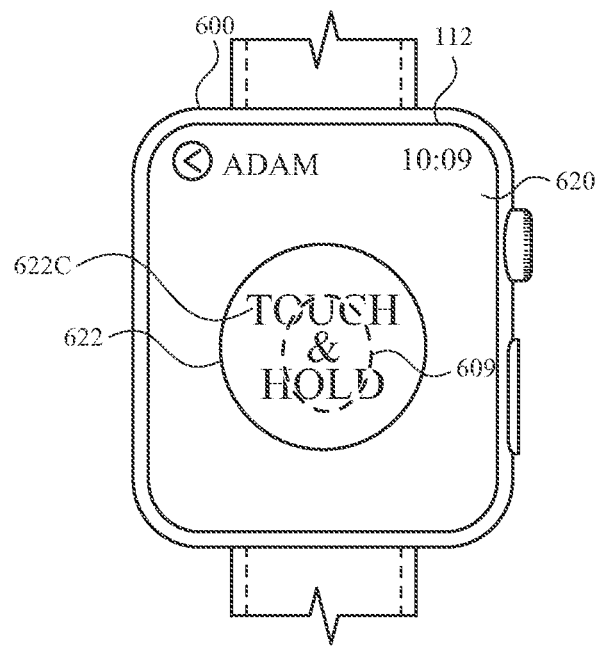

FIG. 6G illustrates electronic device 600 displaying, on display device 112, communication user interface 620, where activatable communication object 622 of communication user interface 620 is displaying second text indication 622C as described above with reference to FIG. 6F.

In FIG. 6G, while displaying communication user interface 620, electronic device 600 detects, via display device 112, an input 609 (e.g., a touch and hold or press and hold input that is maintained for at least a predetermined activation time period) directed to activatable communication object 622, where input 609 corresponds to the particular type of input required to successfully initiate an outgoing electronic voice communication.

Figure 6H:
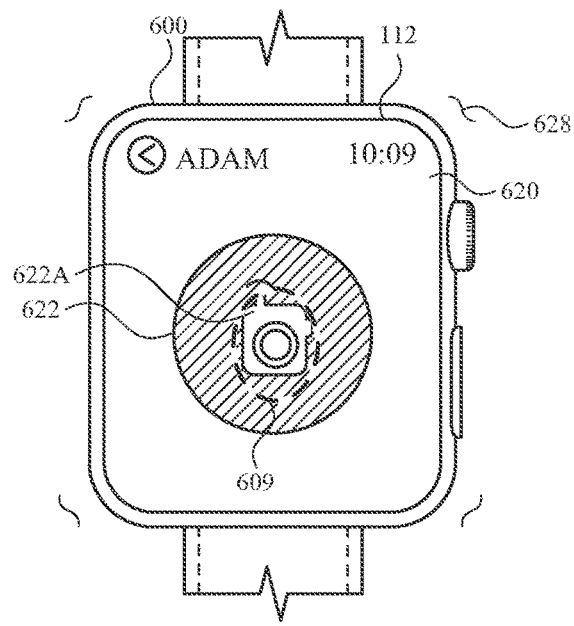
Figure 6I:
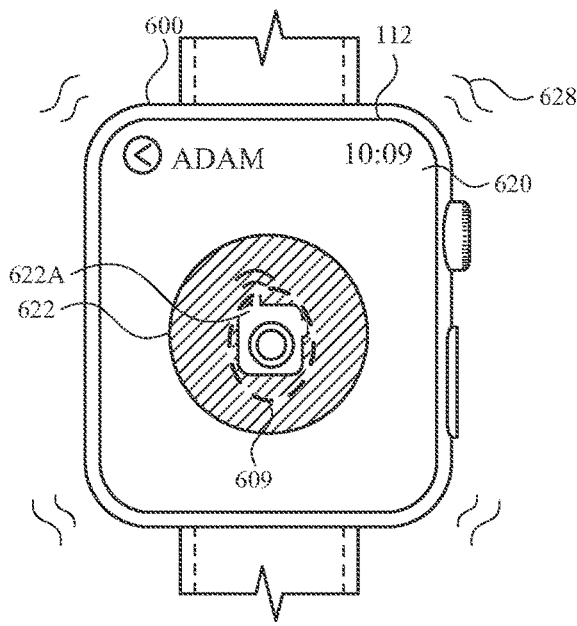
Figure 6J:
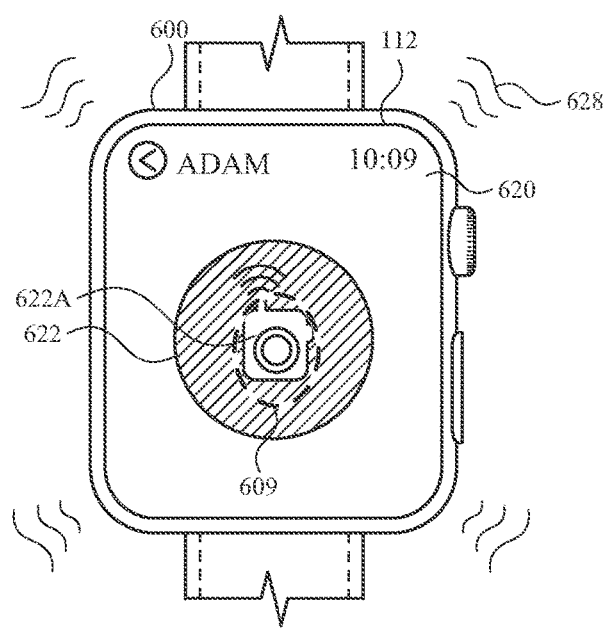

FIGS. 6H-6J illustrate electronic device 600 displaying, on display device 112, communication user interface 620 while detecting an input directed to activatable communication object 622 that corresponds to the particular type of input (e.g., a touch and hold or press and hold input that is maintained for at least a predetermined activation time period) required to successfully initiate an outgoing electronic voice communication (e.g., continuing to detect input 609 on activatable communication object 622).

In some embodiments, in accordance with a determination that the input directed to activatable communication object 622 corresponds to the particular type of input (e.g., a touch and hold or press and hold input that is maintained for at least a predetermined activation time period) required to successfully initiate an outgoing electronic voice communication (e.g., input 609), electronic device 600 displays (e.g., maintains display of or re-displays), in activatable communication object 620, graphical indication 622A (e.g., an image of one or more waves/signals emanating from object 622; an animation of three such waves/signals emanating from object 622). In some embodiments, in accordance with a determination that the input directed to activatable communication object 622 corresponds to the particular type of input required to successfully initiate an outgoing electronic voice communication (e.g., input 609), electronic device 600 displays activatable communication object 622 with a second visual characteristic (e.g., a second color (e.g., a recording/transmitting mode color, such as green)). In some embodiments, electronic device 600 displays activatable communication object 622 with the second color (e.g., green) as its background color (e.g., changes the background color from the first color, such as yellow, to the second color, such as green). In some embodiments, the second color (e.g., green) is used, to indicate that a voice communication mode is currently activated.

In some embodiments, in accordance with a determination that the input directed to activatable communication object 622 corresponds to the particular type of input required to successfully initiate an outgoing electronic voice communication (e.g., input 609), and while displaying communication user interface 620, electronic device 600 generates (e.g., via one or more tactile output generates of electronic device 600, such as tactile output generators 167) a tactile output sequence 628 (e.g., a particular type of haptic or haptic sequence) indicating that electronic device 600 is now ready to record and/or transmit (e.g., simultaneously) a voice message to be transmitted as an outgoing electronic voice communication to the participant of the current communication session (in this example, to user contact Adam). In some embodiments, tactile output sequence 628 is a sequence of three individual tactile outputs (e.g., representing a three-beep sequence commonly generated by a typical walkie talkie device when activated).

In some embodiments, in accordance with a determination that the input directed to activatable communication object 622 corresponds to the particular type of input required to successfully initiate an outgoing electronic voice communication (e.g., input 609), and while displaying communication user interface 620, electronic device 600 generates (e.g., via one or more speakers of electronic device 600, such as speaker 111) an audio output (e.g., a particular type of audio tone) indicating that electronic device 600 is now ready to receive (e.g., record) a voice message to be transmitted as an outgoing electronic voice communication to the participant of the current communication session (in this example, to user contact Adam). In some embodiments, the audio output is a sequence of three individual and distinct audio tones (e.g., a three-beep tone similar to that commonly generated by a typical walkie talkie device when activated). In some embodiments, the audio output is generated in addition to or alternatively to tactile output sequence 628. In some embodiments, tactile output sequence 628, animation of object 622A, and the audio output are generated in sync (e.g., to be aligned). In some embodiments, tactile output sequence 628 and the audio output are generated to not be in sync (e.g., to not be aligned, such that an individual tactile output is not generated at the same moment as an individual audio tone).

Figure 6K:
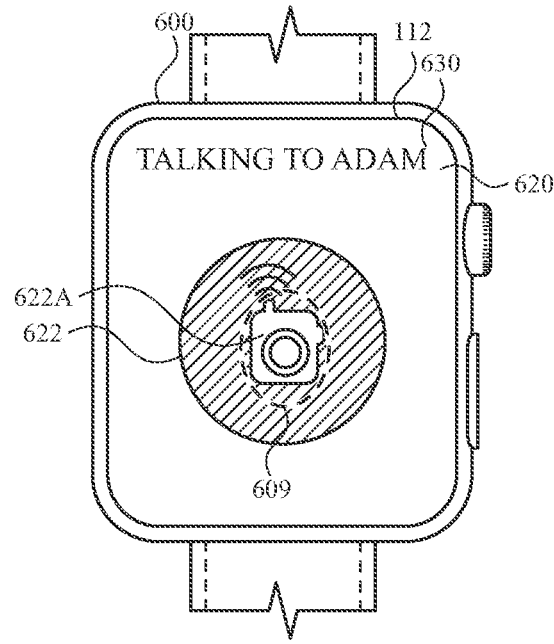

FIG. 6K illustrates electronic device 600 displaying, on display device 112, communication user interface 620 of the voice communication application in a recording/transmitting mode (e.g., a sending mode; an outgoing mode; a mode corresponding to when electronic device 600 is recording a voice message and transmitting the voice message as an outgoing electronic voice communication). In some embodiments, in the recording/transmitting mode, electronic device 600 maintains display of activatable communication object 622 of communication user interface 620 with graphical indication 622A and with the second visual characteristic (e.g., the second color, such as green), as in FIGS. 6H-6J.

In some embodiments, in the recording/transmitting mode, electronic device 600 displays, in communication user interface 620, an indication 630 (in this example, stating "Talk to Adam") that electronic device 600 is in the recording/transmitting mode, and a voice message can be recorded and transmitted as an outgoing electronic voice communication to the participant of the current communication session (in this example, user contact Adam).

Electronic device 600 remains in the recording/transmitting mode, as shown in FIG. 6K, while the input directed to activatable communication object 622 (e.g., input 609) is maintained on activatable communication object 622. That is, while the input directed to activatable communication object 622 (e.g., input 609) is maintained on activatable communication object 622, electronic device 600 records (e.g., via one or more microphones of electronic device, such as microphone 113) a voice utterance made by the user of electronic device 600 and transmits (e.g., in real time, while continuing to record the voice utterance) the recorded voice message (or the voice message being recorded) as an outgoing electronic voice communication to the second electronic device of the participant of the current communication session (in this example, the electronic device of user contact Adam) such that the outgoing electronic voice communication is (or can be) played at the second electronic device.

Figure 6L:
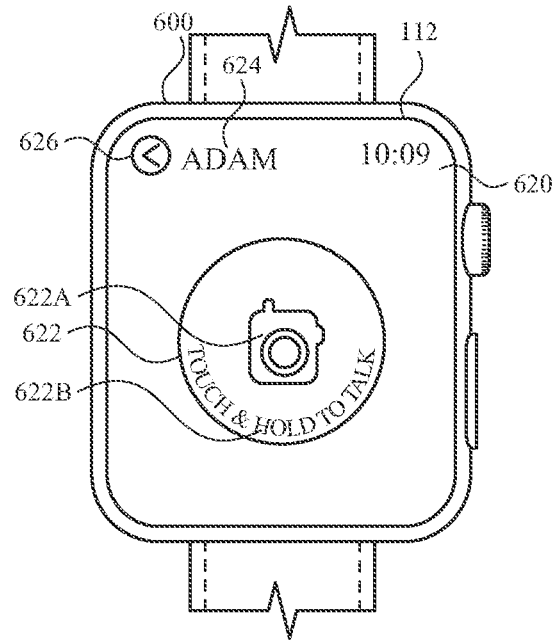

In FIG. 6L, the input directed to activatable communication object 622 that corresponded to the particular type of input required to initiate an outgoing electronic voice communication (e.g., input 609) is no longer maintained on activatable communication object 622. In some embodiments, in accordance with a determination that the input directed to activatable communication object 622 that corresponded to the particular type of input required to initiate an outgoing electronic voice communication (e.g., input 609) is no longer maintained on activatable communication object 622, electronic device 600 displays (e.g., re-displays) communication user interface 620 in the neutral mode, as first described above with reference to FIG. 6E. As discussed, in some embodiments, in the neutral mode, electronic device 600 displays, in activatable communication object 622 of communication user interface 620, graphical indication 622A (e.g., a graphical representation or image of a voice communication device, such as a walkie talkie) indicating that activatable communication object 622 can be used to activate an outgoing electronic voice communication and first text indication 622B that includes instructions (e.g., stating "Touch and Hold to Talk") for activating activatable communication object 622 to send an outgoing electronic voice communication. In some embodiments, electronic device 600 also displays activatable communication object 622 with the first visual characteristic (e.g., the first color, such as yellow). In some embodiments, electronic device 600 also ceases to display, in communication user interface 620, indication 630 (that electronic device 600 is in the recording/transmitting mode, and (e.g., instead) displays, in communication user interface 620, indication 624 of the respective user contact (in this example, user contact Adam) corresponding to the engaged participant of the current communication session and user contacts affordance 626 for causing display of user contacts user interface 602.

Figure 6M:
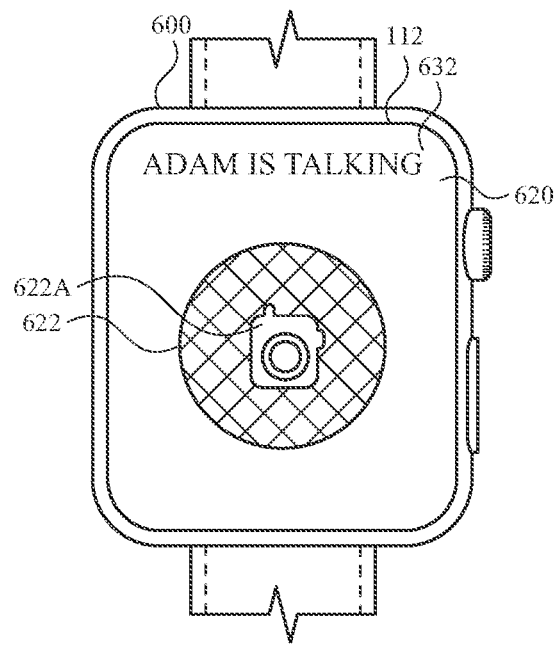

FIG. 6M illustrates electronic device 600 displaying, on display device 112, communication user interface 620 of the voice communication application in a playing mode (e.g., a receiving mode; an incoming mode; a mode corresponding to when electronic device 600 is playing a voice message corresponding to an incoming electronic voice communication received from the participant of the current communication session). In some embodiments, in the playing mode, electronic device 600 maintains display of graphical indication 622A in activatable communication object 622 of communication user interface 620.

In some embodiments, in the playing mode, electronic device 600 generates an audio message corresponding to the received voice message of the incoming electronic voice communication from the participant of the current communication session (in this example, user contact Adam). In some embodiments, while electronic device 600 is generating the audio message corresponding to the received voice message, electronic device 600 disables (e.g., disallows, prohibits) a voice message to be sent as an outgoing electronic voice communication from being recorded and/or from being able to recorded (and thus disables activatable communication object 622 from being able to be activated). In some embodiments, in the playing mode, electronic device 600 displays activatable communications object 622 with a third visual characteristic (e.g., a third color (e.g., a playing mode color, such as grey)) which indicates that activatable communication object 622 cannot be activated while electronic device 600 is generating the audio message corresponding to the received voice message. In some embodiments, electronic device 600 displays activatable communication object 622 with the third color (e.g., grey) as the background color.

Figure 6N:
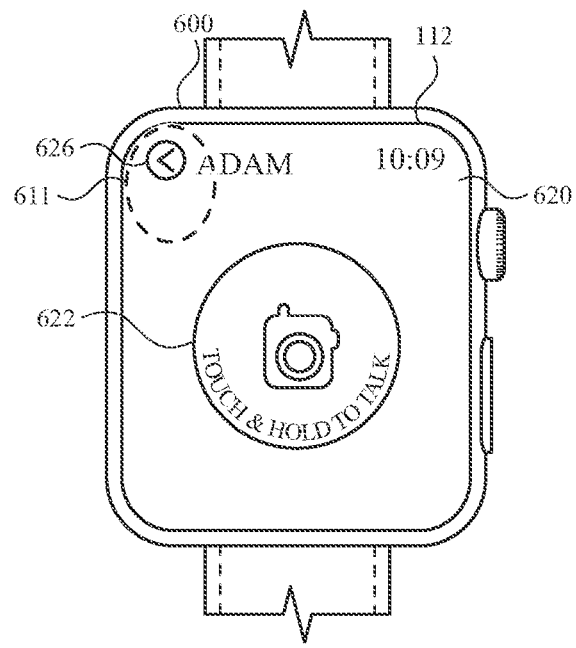

In FIG. 6N, electronic device 600 is no longer generating the audio message corresponding to the received voice message of the incoming electronic voice communication from the participant of the current communication session (in this example, user contact Adam)—that is, electronic device 600 is no longer in playing mode and is now in the neutral mode. In the neutral mode, electronic device 600 again displays activatable communication object 622 of communication user interface 620 with graphical indication 622A, first text indication 622B, and in the first visual characteristic (e.g., the first color, such as yellow), as described above with reference to FIGS. 6E and 6L. In the neutral mode, electronic device 600 also displays indication 624 of the respective user contact (in this example, user contact Adam) and user contacts affordance 626 for causing display of user contacts user interface 602.

In FIG. 6N, while the voice communication application is in the neutral mode, electronic device 600 detects, via display device 112, an activation 611 of (e.g., a selection of; a tap input on; a tap gesture directed to) user contacts affordance 626.

Figure 6O:
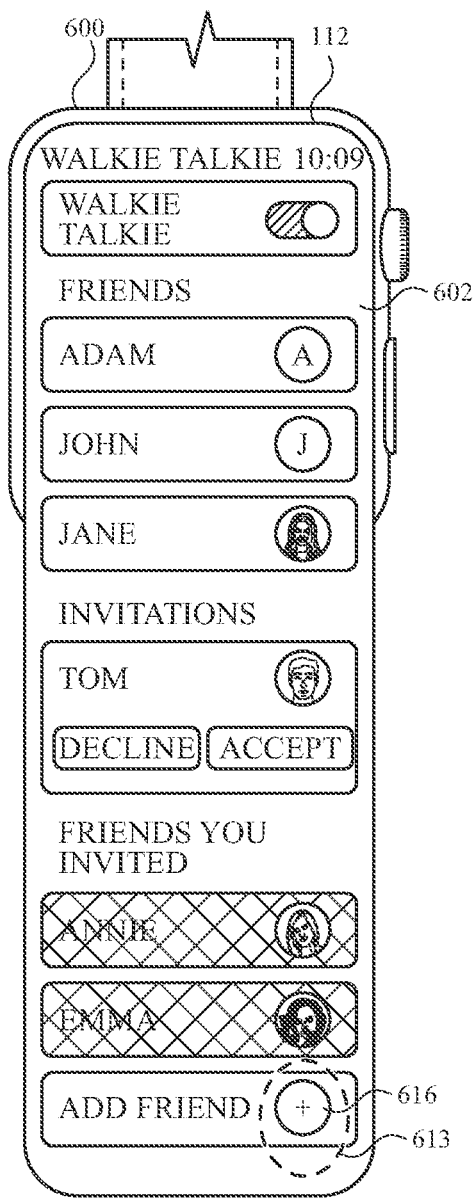

In FIG. 6O, in response to detecting activation 611 of user contacts affordance 626 of communication user interface 620, electronic device 600 displays, on display device 112, user contacts user interface 602 of the voice communication application, as first described above with reference to FIG. 6A.

As discussed, in some embodiments, user contacts user interface 602 includes add user contact affordance 616 for selecting one or more new user contacts for the voice communication application (e.g., from an existing friends list or users list) to which invitations requesting participation in electronic voice communications (e.g., voice messages) via the voice communication application are to be sent.

In FIG. 6O, while displaying user contacts user interface 602 of the voice communication application, electronic device 600 detects, via display device 112, an activation 613 of (e.g., a selection of; a tap input on; a tap gesture directed to) add user contact affordance 616.

Figure 6P:
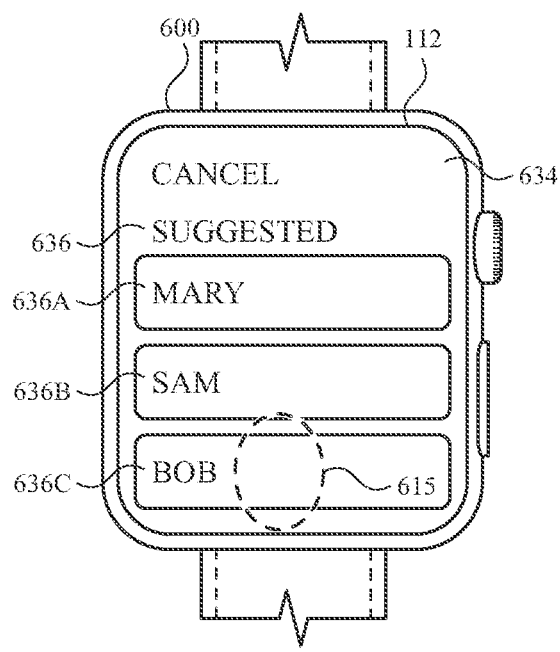

In FIG. 6P, in response to detecting activation 613 of add user contact affordance 616 of user contacts user interface 602 of the voice communication application, electronic device 600 displays, on display device 112, an add user contact user interface 634 (e.g., an accessible contacts list) that includes one or more suggested new user contacts 636 for which invitations can be sent requesting participation in electronic voice communication via the voice communication application. In this example, suggested new user contacts 636 includes a suggested new user contact 636A (in this example, user contact Mary), a suggested new user contact 636B (in this example, user contact Sam), and a suggested new user contact 636C (in this example, user contact Bob). In some embodiments, the suggested new user contacts included in (e.g., listed in) suggested new user contacts 636 correspond to those that are linked with (e.g., using; registered with; signed in or logged in on) a respective electronic device that is capable of and/or can be configured to engage in electronic voice communications via a corresponding voice communication application on the respective electronic device. In some embodiments, add user contact user interface 634 also includes (e.g., below one or more suggested new user contacts 636 in the user interface) one or more non-suggested new user contacts (e.g., corresponding to user contacts for whom it is uncertain whether linked with (e.g., using; registered with; signed in or logged in on) a respective electronic device that is capable of and/or can be configured to engage in electronic voice communications via a corresponding voice communication application on the respective electronic device).

In FIG. 6P, while displaying add user contact user interface 634, electronic device 600 detects, via display device 112, a selection 615 of (e.g., a tap input on; a tap gesture directed to) suggested user contact 636C (in this example, suggested user contact Bob) of suggested new user contacts 636.

Figure 6Q:
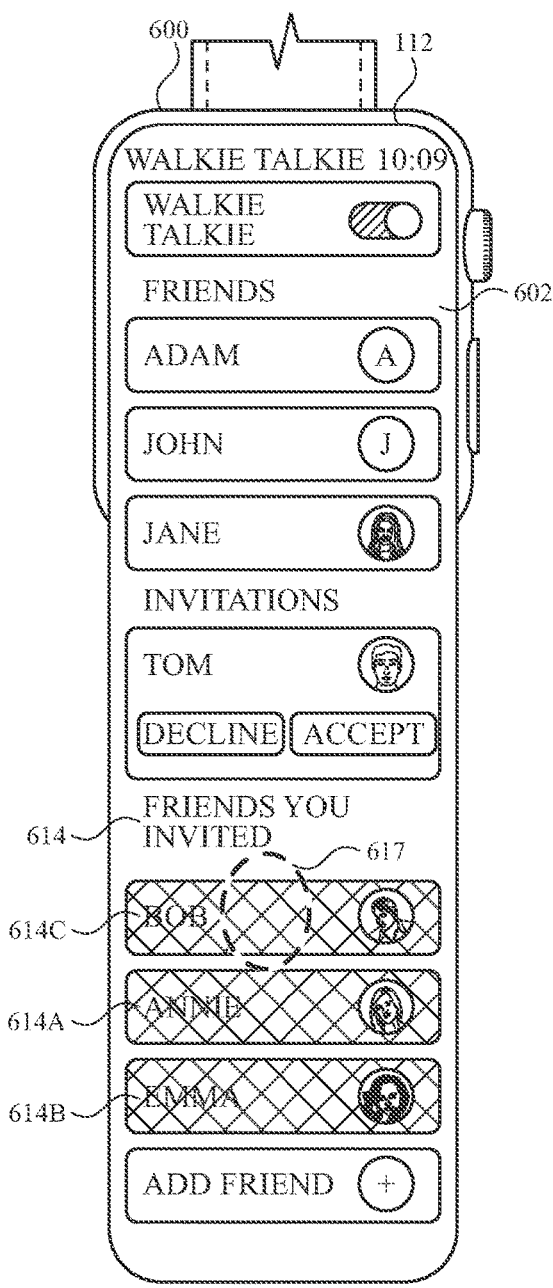

In FIG. 6Q, in response to detecting selection 615 of suggested user contact 636C (in this example, suggested user contact Bob), electronic device 600 displays, on display device 112, user contacts user interface 602 of the voice communication application where user contacts user interface 602 now includes, in invited user contacts region 614, a representation of an invited user contact 614C corresponding to suggested new user contact 636C (in this example, user contact Bob) in addition to representations of an invited user contact 614A and 614B. Further in response to detecting selection 615 of suggested new user contact 636C (in this example, user contact Bob), electronic device 600 transmits (or initiates a process for transmitting) an electronic communication to the respective user contact (in this example, user contact Bob) corresponding to an invitation to participate in electronic voice commutations via the voice communication application. In some embodiments, in accordance with a determination that the invitation has been accepted by the respective user contact (in this example, has been accepted by Bob), electronic device 600 removes display of representation of an invited user contact 614C corresponding to the respective user contact from invited user contacts region 614 and instead displays a corresponding representation of an approved user contact in approved user contacts region 606 for the same user contact (in this example, user contact Bob).

In FIG. 6Q, while displaying, in invited user contacts region 614 of user contacts user interface 602, representation of an invited user contact 614C corresponding to the respective user contact (in this example, user contact Bob), electronic device 600 detects, via display device 112, a selection 617 of (e.g., a selection of; a tap input on; a tap gesture directed to) representation of an invited user contact 614C.

Figure 6R:
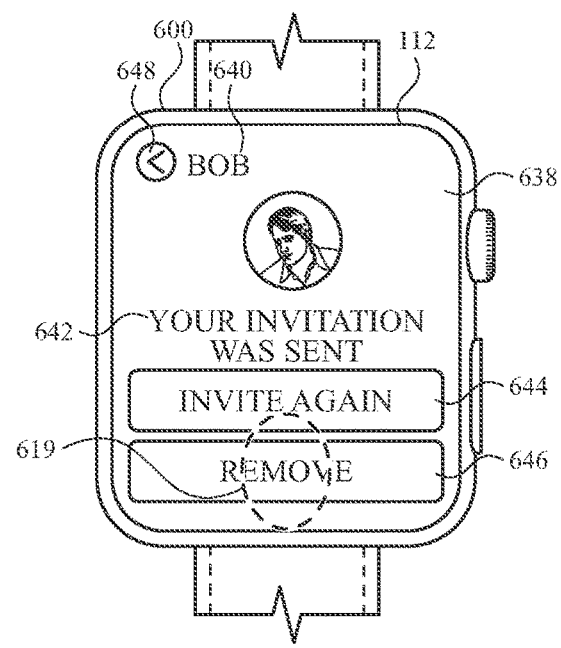
Figure 6S:
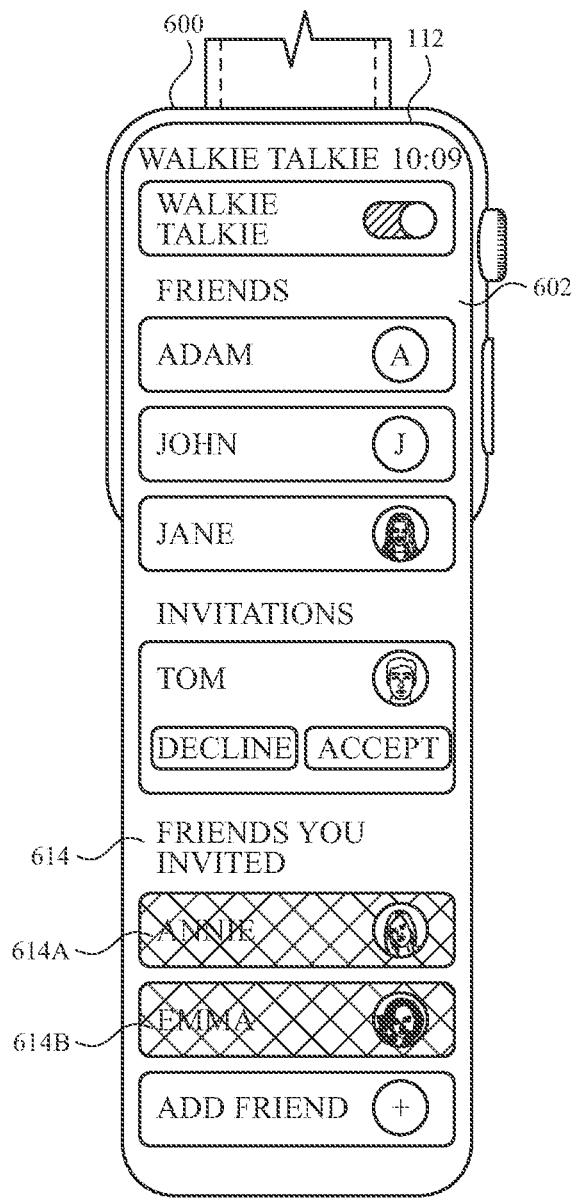
Figure 7A:
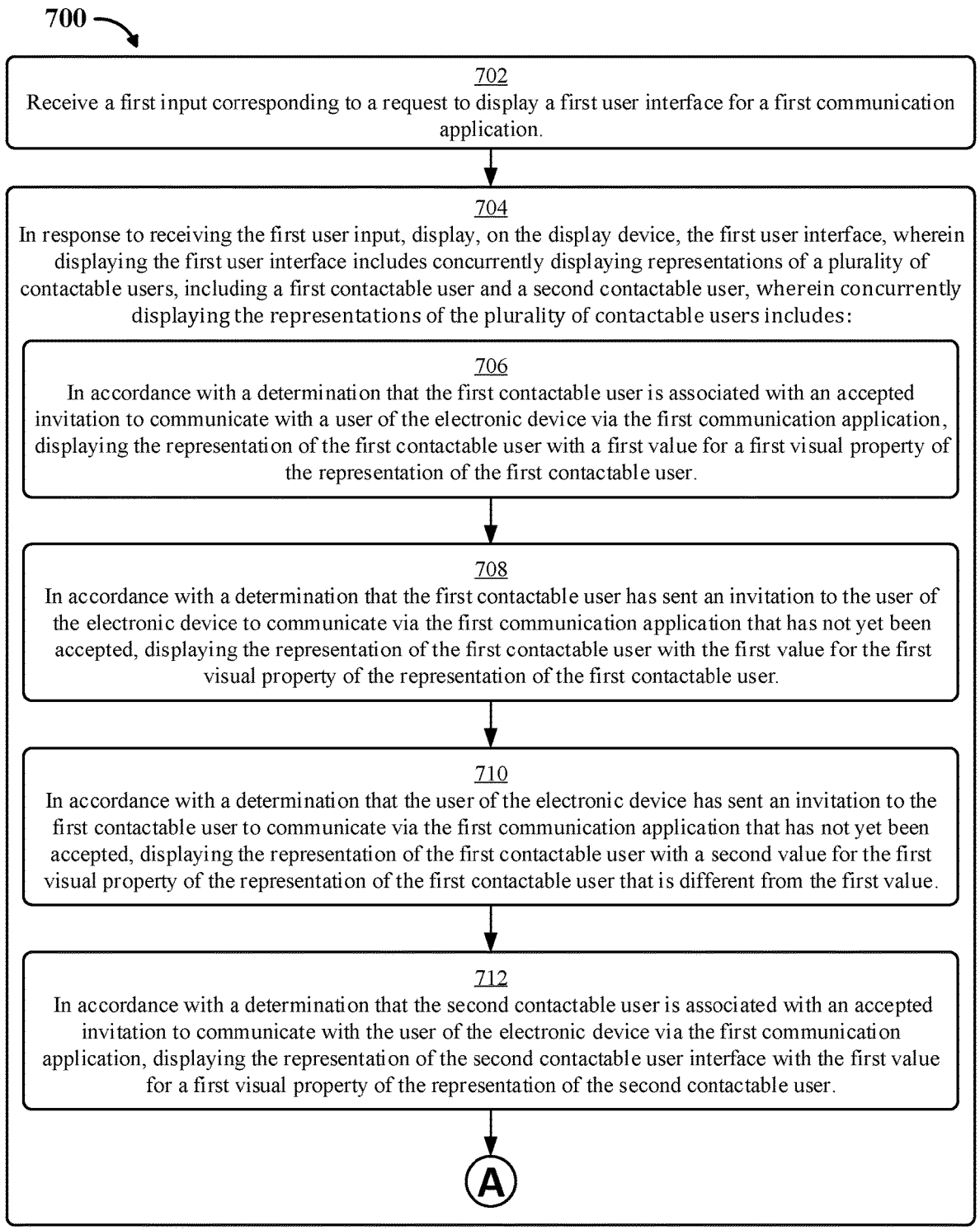
Figure 7B:
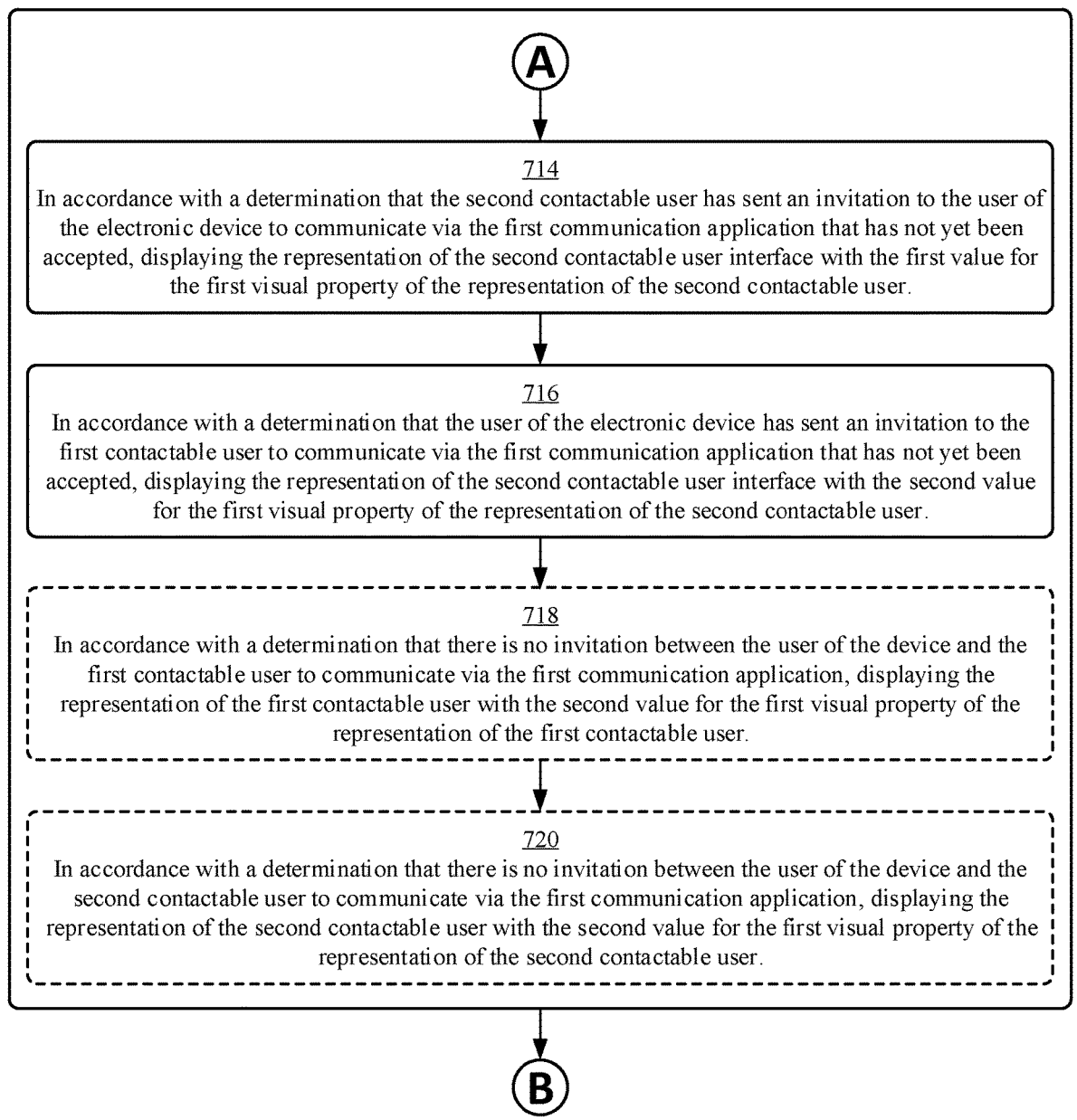

In FIG. 6R, in response to detecting selection 617 of representation of a user contact 614C in invited user contacts region 614 of user contacts user interface 602, electronic device 600 displays, on display device 112, an invitation user interface 638 corresponding to the respective representation of an invited user contact (in this example, corresponding to the invitation sent to user contact Bob).

In some embodiments, invitation user interface 638 includes an indication 640 of the invited user contact (in this example, invited user contact Bob). In some embodiments, invitation user interface 638 includes an indication 642 that an electronic communication corresponding to the invitation to participate in electronic voice communications via the voice communication application has been sent to the respective invited user contact (in this example, invited user contact Bob). In some embodiments, invitation user interface 638 includes an invite again affordance 644 for causing electronic device 600 to initiate the transmittal of another electronic communication corresponding to another invitation (e.g., a second invitation; a follow-up invitation) to participate in electronic voice communications via the voice communication application has been sent to the respective invited user contact (in this example, invited user contact Bob). In some embodiments, invitation user interface 638 includes a remove affordance 646 for removing or cancelling the corresponding invitation such that it can no longer be accepted by the invited user contact (in this example, invited user contact Bob). In some embodiments, invitation user interface 638 includes a user contacts affordance 648 for returning to user contacts user interface 602.

In FIG. 6R, while displaying invitation user interface 638 corresponding to the invited user contact of representation of an invited user contact 614C (in this example, invited user contact Bob), electronic device 600 detects, via display device 112, a selection 619 of (e.g., a selection of; a tap input on; a tap gesture directed to) remove affordance 646.

In FIG. 6S, electronic device 600 again displays, on display device 112, user contacts user interface 602, as in FIG. 6Q, but without displaying, in invited user contacts region 614, representation of an invited user contact 614C corresponding to the respective invited user contact (in this example, Bob), as the invitation corresponding to the respective invited user contact has been canceled by input 619 in FIG. 6R. In some embodiments, electronic device 600 also initiates a process for canceling the invitation such that the respective invited user contact (in this example, invited user contact Bob) can no longer accepted the sent invitation that was initiated via input 615 in FIG. 6P. Thus, in this example, electronic device 600 only displays, in invited user contacts region 614 of user contacts user interface 602, representation of an invited user contact 614A (in this example, invited user contact Annie) and representation of an invited user contact 614B (in this example, invited user contact Emma).

FIGS. 7A-7D are a flow diagram illustrating a method for managing user contacts for electronic voice communications using an electronic device, in accordance with some embodiments. Method 700 is performed at an electronic device (e.g., 100, 300, 500; a smartwatch, a smartphone) with a display device (e.g., 112) and a wireless communication radio (e.g., for LTE, WiFi, and/or Bluetooth connections). Some operations in method 700 are, optionally, combined, the orders of some operations are, optionally, changed, and some operations are, optionally, omitted.

As described below, method 700 provides an intuitive way for managing electronic voice communications. The method reduces the cognitive burden on a user for managing electronic voice communications, thereby creating a more efficient human-machine interface. For battery-operated computing devices, enabling a user to manage electronic voice communications faster and more efficiently conserves power and increases the time between battery charges.

The electronic device (e.g., 600) receives (702) a first input corresponding to a request to display a first user interface (e.g., a contactable users user interface) for a first communication application (e.g., a voice communication application; an asynchronous voice communication application).

In response to receiving the first user input, the electronic device (e.g., 100) displays (704), on the display device (e.g., 112), the first user interface (e.g., 602), wherein displaying the first user interface includes concurrently displaying representations of a plurality of contactable users (e.g., 606A, 606B, 606C, 610, 612, 614A, 614B, 614C; affordances for the plurality of contactable users), including a first contactable user and a second contactable user. Displaying the first user interface that includes concurrently displaying representations of a plurality of contactable users enables a user to quickly and easily recognize which contactable users that can be selected for an electronic voice communication session. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user interface (e.g., 602) does not include a representation (e.g., does not include any representations) corresponding to a contactable user that cannot communicate with the user of the electronic device (e.g., 600) via the first communication application. Not including a representation corresponding to a contactable user that cannot communicate with the user of the electronic device via the first communication application enables a user to quickly and easily identify contactable users that can engage in an electric voice communication via the first communication application with the user. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the first user interface (e.g., 602) only includes representations corresponding to contactable users (e.g., 606A, 606B, 606C) who are associated with external electronic devices configured to communicate with the user of the electronic device via the first communication application. In some embodiments, a contactable user who is only associated with an external electronic device(s) that are incapable (e.g., due to hardware compatibility limitations) of communicating with the user of the electronic device via the first communication application are excluded from having their representation included in the first user interface.

In some embodiments, displaying the first user interface (e.g., 602) includes displaying an add affordance (e.g., 616) that, when selected, initiates a process for sending an invitation to a third contactable user to communicate via the first communication application. In some embodiments, after (e.g., in response to) sending the invitation to the third contactable user, a representation of third contactable user (e.g., 614C) is displayed with the second value for the first visual property of the representation of the third contactable user.

Concurrently displaying the representations of the plurality of contactable users (e.g., 606A, 606B, 606C, 610, 612, 614A, 614B, 614C) includes (704), in accordance with a determination that the first contactable user (e.g., 606A, 606B, 606C) is associated with an accepted invitation (e.g., an invitation sent by the first contactable user and accepted by the user of the electronic device or an invitation sent by the user of the electronic device to the first contactable user and accepted by the first contactable user) to communicate with a user of the electronic device (e.g., 600) via the first communication application (e.g., the user of the electronic device is approved to initiate or enter a voice communication session with the first contactable user using the first communication application), the electronic device (e.g.,

600) displaying (706) the representation of the first contactable user with a first value (e.g., yellow; a solid pattern) for a first visual property (e.g., a color; a pattern) of the representation of the first contactable user. Displaying the representation of the first contactable user with the first value for the first visual property enables a user to quickly and easily recognize that the user can readily engage in a communication session with the first contactable user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Concurrently displaying the representations of the plurality of contactable users (e.g., 606A, 606B, 606C, 610, 612, 614A, 614B, 614C) includes (704), in accordance with a determination that the first contactable user (e.g., 610, 612) has sent an invitation to the user of the electronic device (e.g., 600) to communicate via the first communication application that has not yet been accepted (e.g., an invitation sent by the first contactable user and not yet accepted by the user of the electronic device; an invitation that causes the user of the electronic device to be approved to initiate or enter a voice communication session with the first contactable user using the first communication application), the electronic device (e.g., 600) displaying (708) the representation of the first contactable user with the first value for the first visual property of the representation of the first contactable user. Displaying the representation of the first contactable user with the first value for the first visual property enables a user to quickly and easily recognize that the user can readily engage in a communication session with the first contactable user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Concurrently displaying the representations of the plurality of contactable users (e.g., 606A, 606B, 606C, 610, 612, 614A, 614B, 614C) includes (704), in accordance with a determination that the user of the electronic device (e.g., 600) has sent an invitation to the first contactable user (e.g., 614A, 614B, 614C) to communicate via the first communication application that has not yet been accepted (e.g., not yet accepted by the first contactable user; the user of the electronic device is not approved to initiate or enter a voice communication session with the first contactable user using the first communication application), the electronic device (e.g., 600) displaying (710) the representation of the first contactable user with a second value (e.g., black or dark grey; a hatched pattern) for the first visual property of the representation of the first contactable user that is different from the first value. Displaying the first contactable user with the second value for the first visual property enables a user to quickly and easily recognize that the user cannot readily engage in a communication session with the first contactable user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Concurrently displaying the representations of the plurality of contactable users (e.g., 606A, 606B, 606C, 610, 612, 614A, 614B, 614C) includes (704), in accordance with a determination that the second contactable user (e.g., 606A, 606B, 606C) is associated with an accepted invitation to communicate with the user of the electronic device via the first communication application, the electronic device (e.g., 600) displaying (712) the representation of the second contactable user interface with the first value for a first visual property of the representation of the second contactable user. Displaying the representation of the second contactable user with the first value for the first visual property enables a user to quickly and easily recognize that the user can readily engage in a communication session with the second contactable user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Concurrently displaying the representations of the plurality of contactable users (e.g., 606A, 606B, 606C, 610, 612, 614A, 614B, 614C) includes (704), in accordance with a determination that the second contactable user (e.g., 610, 612) has sent an invitation to the user of the electronic device to communicate via the first communication application that has not yet been accepted, the electronic device (e.g., 600) displaying (714) the representation of the second contactable user interface with the first value for the first visual property of the representation of the second contactable user. Displaying the representation of the second contactable user with the first value for the first visual property enables a user to quickly and easily recognize that the user can readily engage in a communication session with the second contactable user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Concurrently displaying the representations of the plurality of contactable users (e.g., 606A, 606B, 606C, 610, 612, 614A, 614B, 614C) includes (704), in accordance with a determination that the user of the electronic device has sent an invitation to the first contactable user (e.g., 614A, 614B, 614C) to communicate via the first communication application that has not yet been accepted, the electronic device (e.g., 600) displaying (716) the representation of the second contactable user interface with the second value for the first visual property of the representation of the second contactable user. Displaying the second contactable user with the second value for the first visual property enables a user to quickly and easily recognize that the user cannot readily engage in a communication session with the second contactable user. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, concurrently displaying the representations of the plurality of contactable users (e.g., 636A, 636B, 636C) includes (704), in accordance with a determination that there is no invitation between the user of the device and the first contactable user to communicate via the first communication application (e.g., the first contactable user is a system-suggested contactable user for whom no invitation has been sent or received), the electronic device (e.g., 600) displaying (718) the representation of the first contactable user with the second value for the first visual property of the representation of the first contactable user. In some embodiments, selecting the first contactable user provides options for, or initiates a process for, sending an invitation to the first contactable user. In some embodiments, concurrently displaying the representations of the plurality of contactable users (e.g., 636A, 636B, 636C) includes (704), in accordance with a determination that there is no invitation between the user of the device and the second contactable user to communicate via the first communication application, the electronic device (e.g., 600) displaying (720) the representation of the second contactable user with the second value for the first visual property of the representation of the second contactable user.

In some embodiments, the first visual property of a representation corresponding to a respective user is a background color of the representation corresponding to the respective user. In some embodiments, the representations of the plurality of contactable users are each graphical objects having a background color and one or more foreground elements (e.g., text, graphical sub-elements) that are displayed with a foreground color different than the background color. In some embodiments, the graphical objects are predominantly background (e.g., the background color is a predominate color of the overall object.

In some embodiments, the representations of a plurality of contactable users (e.g., 606A, 606B, 606C, 610, 612, 614A, 614B, 614C) are displayed as an ordered list. Displaying the representations of a plurality of contactable users in an ordered list enable a user to more conveniently access contactable users that the user can readily engage in a communication session with. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, representations of the plurality of contactable users (e.g., 606A, 606B, 606C) that correspond to accepted invitations are at positions in the ordered list before the positions of representations of the plurality of contactable users (e.g., 610, 612) that correspond to contactable users that have sent invitations to the user of the electronic device to communicate via the first communication application that have not yet been accepted and before the positions of representations of the plurality of contactable users (e.g., 614A, 614B, 614C) that correspond to contactable users that the user of the electronic device has sent invitations to communicate via the first communication application that have not yet been accepted. In some embodiments, representations of the plurality of contactable users that correspond to accepted invitations are displayed first in a list of contactable users that are displayed in the first user interface.

In some embodiments, in accordance with a determination that the first contactable user (e.g., 610, 612) has sent an invitation to the user of the electronic device (e.g., 600) to communicate via the first communication application that has not yet been accepted, the electronic device displays (722), in association with (e.g., inside the representation; as part of the representation; overlaid on the representation; adjacent to the representation) the representation of the first contactable user, an accept affordance (e.g., 610A, 612A) that, when selected, accepts the invitation from the first contactable user to the user of the electronic device to communicate via the first communication application (724), and a decline affordance (e.g., 610B, 612B) that, when selected, declines (e.g., rejects) the invitation from the first contactable user to the user of the electronic device to communicate via the first communication application (726). In some embodiments, selection of the accept affordance (e.g., 610A, 612A) causes the representation of the first contactable user (e.g., 610, 612) to be classified as a representation of a contactable user associated with an accepted invitation. In some embodiments, selection of the decline affordance (e.g., 612A, 612B) causes the representation of the first contactable user (e.g., 610, 612) to be classified as a representation of a contactable user associated with a declined invitation. In some embodiments, selection of the decline affordance causes the representation of the first contactable user to no longer be displayed in the first user interface.

In some embodiments, representations of the plurality of contactable users (e.g., 610, 612) that correspond to contactable users that have sent invitations to the user of the electronic device (e.g., 600) to communicate via the first communication application that have not yet been accepted are at positions in the ordered list before the positions of representations of the plurality of contactable users that correspond to contactable users that the user of the electronic device has sent invitations to communicate via the first communication application that have not yet been accepted. In some embodiments, representations of the plurality of contactable users (e.g., 614A, 614B, 614C) that correspond to contactable users that the user of the electronic device has sent invitations to communicate via the first communication application that have not yet been accepted are displayed last in a list of contactable users that are displayed in the first user interface. Displaying the representations of the plurality of contactable users that correspond to contactable users that the user of the electronic device has sent invitations to communicate via the first communication application that have not yet been accepted last in the user interfaces constitutes an efficient use of screen real estate such that a user is provided with the options and/or information that are least likely to be relevant or needed by the user at the least-accessed portion of the user interface. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user of the electronic device (e.g., 600) has sent an invitation to the first contactable user (e.g., 614A, 614B, 614C) to communicate via the first communication application that has not yet been accepted and the representation of the first user is displayed with the second value for the first visual property of the representation of the first contactable user (728). In some embodiments, the electronic device (e.g., 600) receives (730) a second user input (e.g., a tap gesture) corresponding to the representation of the first contactable user. In some embodiments, in response to receiving the second user input, the electronic device (e.g., 600) displays (732), via the display device (e.g., 112), a second user interface (e.g., 638) that includes a re-invite affordance (e.g., 644) that, when selected, sends another invitation to the first contactable user to communicate via the first communication application, and a rescind invitation affordance (e.g., 646) that, when selected, rescinds the invitation to the first contactable user to communicate via the first communication application (e.g., sends data to the first contactable user indicating that the invitation can no longer be accepted). In some embodiments, receiving an indication that an invitation has been rescinded causes an external electronic device corresponding to the first user to no longer display a representation of the user of the electronic device (e.g., 600) in a counterpart of the first user interface.

In some embodiments, the electronic device (e.g., 600) receives (734) a third user input (e.g., a tap gesture on the representation; a tap gesture on an accept affordance associated with the representation) corresponding to a representation of a fourth contactable user (e.g., the first or second contactable users; a contactable user other than the first or second contactable users) that is displayed with the first value for the first visual property of the representation of the fourth contactable user. In some embodiments, in response to receiving the third user input, the electronic device (e.g., 600) initiates (736) a process for establishing a communication session with the fourth contactable user using the first communication application (e.g., including displaying a third user interface that includes an affordance for communicating with the fourth contactable user (e.g., via communication user interface 620 first described above with reference to FIG. 6E)).

Note that details of the processes described above with respect to method 700 (e.g., FIGS. 7A-7D) are also applicable in an analogous manner to the methods described below. For example, method 800 optionally includes one or more of the characteristics of the various methods described above with reference to method 700. For example, the communication user interface (e.g., 620) described below with reference to method 800 can be used to engage in an electronic voice communication session with a contactable user selected from the first user interface (e.g., 602). For brevity, these details are not repeated below.

FIGS. 8A-8C are a flow diagram illustrating a method for managing incoming and outgoing electronic voice communications using an electronic device, in accordance with some embodiments. Method 800 is performed at an electronic device (e.g., 100, 300, 500; a smartwatch, a smartphone) with a display device (e.g., 112) and a wireless communication radio (e.g., for LTE, WiFi, and/or Bluetooth connections). Some operations in method 800 are, optionally, combined, the orders of some operations are, optionally, changed, and some operations are, optionally, omitted.

As described below, method 800 provides an intuitive way for managing electronic voice communications. The method reduces the cognitive burden on a user for managing electronic voice communications, thereby creating a more efficient human-machine interface. For battery-operated computing devices, enabling a user to manage electronic voice communications faster and more efficiently conserves power and increases the time between battery charges.

The electronic device (e.g., 600) displays (802), via the display device (e.g., 112; a touch-sensitive display), a communication user interface (e.g., 620) that includes an activatable indicator (e.g., 622; a push to talk button) displayed with a first visual appearance (e.g., having a first color (e.g., color pattern), a first shape, including first graphical and/or textual content).

The electronic device (e.g., 600) receives (804) a first input (e.g., a touch input) corresponding to (e.g., at a location on a touch-sensitive surface that corresponds to the activatable indicator, on the activatable indicator) the activatable indicator (e.g., 622) displayed with the first visual appearance.

In response to receiving the first input (806), in accordance with a determination that the first input satisfies a set of input criteria (e.g., including a first criterion that is satisfied when the touch input is maintained for a predetermined period of time, including a second criterion that is satisfied when the touch input includes a characteristic intensity greater than an intensity threshold) (808), the electronic device (e.g., 600) initiates (810), via the wireless communication radio, a voice communication session (e.g., an asynchronous voice communication session, a half-duplex communication, an audio communication session) with a second electronic device (e.g., a second smart watch, a second smart phone). By initiating (e.g., automatically, without further user input) the voice communication session in accordance with the determination that the first input satisfies a set of input criteria, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the first input (806), in accordance with a determination that the first input satisfies a set of input criteria (e.g., including a first criterion that is satisfied when the touch input is maintained for a predetermined period of time, including a second criterion that is satisfied when the touch input includes a characteristic intensity greater than an intensity threshold) (808), the electronic device (e.g., 600) displays (e.g., modifies the display of) (812) the activatable indicator (e.g., 622) with a second visual appearance (e.g., a visual appearance that is the same as the first visual appearance; a visual appearance that is different from the first visual appearance (e.g., different in color, size, shape, and/or graphical or textual content)).

In some embodiments, the second visual appearance of the activatable indicator (e.g., 622) is different from the first visual appearance of the activatable indicator (e.g., the first appearance has a first primary/majority color (e.g., yellow) and the second appearance has a different, second primary/majority color (e.g., green); the first appearance includes first text (e.g., "press and hold to talk") and the second appearance does not include text)).

In response to receiving the first input (806), in accordance with a determination that the first input does not satisfy the set of input criteria (814), the electronic device (e.g., 600) displays (e.g., modifies the display of) (816) the activatable indicator (e.g., 622) with a third visual appearance that is different from the second visual appearance (e.g., different in color, size, shape, and/or graphical or textual content), the third visual appearance including an indication of an input that would satisfy the set of input criteria, wherein displaying the activatable indicator with the third appearance occurs without initiating, via the wireless communication radio, a voice communication session (e.g., an asynchronous voice communication session, a half-duplex communication, an audio communication session) with the second electronic device (e.g., graphical or textual guidance depicting the criteria and/or how the first user input failed to meet the criteria). In some embodiments, the electronic device (e.g., 600) further forgoes initiating, via the wireless communication radio, a voice communication session (e.g., an asynchronous voice communication session, a half-duplex communication audio communication session) with a second electronic device (e.g., a second smart watch, a second smart phone). Displaying the activatable indicator with the third visual appearance that is different from the second visual appearance in accordance with the determination that the first input does not satisfy the set of input criteria enables a user to quickly and easily recognize that the user's input failed to satisfy the criteria needed to proceed with the voice communication session, and thus that the input should be changed or adjusted. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently In some embodiments, prior to displaying the communication user interface (e.g., 620) and prior to a determination that the second electronic device is available to conduct a voice communication session with the electronic device (e.g., 600) (e.g., that the second electronic device is available to accept requests to initiate a voice communication session), the electronic device displays, via the display device (e.g., 112), a communication initiation user interface (e.g., 618) that does not include the activatable indicator. In some embodiments, the communication user interface (e.g., 620) that includes the activatable indicator (e.g., 622) is displayed in accordance with the determination that the second electronic device is available to conduct a voice communication session with the electronic device (e.g., 600). In some embodiments, the electronic device (e.g., 600) receives an indication (e.g., data) that the second electronic device is available to conduct a voice communication session with the electronic device and makes a determination based on that indication. In some embodiments, in accordance with a determination that the second electronic device is not available to conduct a voice communication session with the electronic device, the electronic device (e.g., 600) displays a visual indication (e.g., a graphical indication, a text indication) that the second electronic device is not available to conduct a voice communication session with the electronic device (e.g., without displaying the communication user interface (e.g., 620) that includes the activatable indicator (e.g., 622)). Displaying the visual indication that the second electronic device is not available to conduct a voice communication session with the electronic device enables a user to quickly and easily recognize that the a voice communication session is not possible with the user of the second electronic device, thereby enabling the user to quickly cease attempts to engage the user of the second electronic device, which in turn makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the communication initiation user interface (e.g., 618) includes an indication (e.g., a graphical indication, a text indication) that availability of the second electronic to conduct a voice communication session with the electronic device (e.g., 600) is being determined.

In some embodiments, the activatable indicator (e.g., 622) with the second appearance occupies a first area in the communication user interface (e.g., 620) (818). In some embodiments, in response to receiving the first input and in accordance with a determination that the first input satisfies a set of input criteria, the electronic device (e.g., 600) displays (820), via the display device (e.g., 112) and at a first location in the communication user interface (e.g., 620) that is outside (e.g., not within) the first area (e.g., above the activatable indicator with the first appearance), an identifier of the second electronic device (e.g., a name of a user or an account associated with the second electronic device (e.g., "Talk to Nick")). By displaying the identifier of the second electronic device in response to receiving the first input and in accordance with the determination that the first input satisfies a set of input criteria, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the activatable indicator (e.g., 622) with the second appearance occupies a second area in the of the communication user interface (e.g., 620) (e.g., an area that is the same as the first area) (822). In some embodiments, in response to receiving the first input and in accordance with a determination that the first input satisfies a set of input criteria displaying, the electronic device (e.g., 600) displays (824), via the display device (e.g., 112), and at a second location in the communication user interface (e.g., 620) that is within the second area, an animated sequence of graphical objects (e.g., an animation a series of wave-shaped objects radiating from an image of an antenna). Displaying the animated sequence of graphical objects enables a user to quickly and easily recognize that the electronic device can now be used to engage in a voice communication session. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the animated sequence of graphical objects includes a first graphical object (e.g., a first wave-shaped object) displayed at a first time and a second graphical object (a second wave-shaped object) displayed at a second time that is later than the first time (826). In some embodiments, at a time at or near the first time, the electronic device (e.g., 600) generates (828) a first non-visual output (e.g., 628) (e.g., a first tactile output (e.g., a haptic tap) and/or a first audio output (e.g., an audio tone)) that corresponds to the first graphical object. In some embodiments, at a time at or near the second time, the electronic device (e.g., 600) generates (830) a second non-visual output (e.g., 628) (e.g., a second tactile output and/or a second audio output) that corresponds to the second graphical object.

In some embodiments, while in a voice communication session with the second electronic device and while the communication user interface (e.g., 620) includes the activatable indicator (e.g., 622) (e.g., having the first, second, or third visual appearances), the electronic device (e.g., 600) receives (832) a voice communication (e.g., voice data) from the second electronic device. In some embodiments, in response to receiving the voice communication (834), the electronic device (e.g., 600) generates (836) an audio output that includes a representation of the voice communication. In some embodiments, in response to receiving the voice communication (834), the electronic device (e.g., 600) ceases to display (838) the activatable indicator (e.g., 622). In some embodiments, the electronic device (e.g., 600) displays a non-activatable indicator occupying the area occupied by the activatable indicator (e.g., 622) and text indicating that a voice communication from the second electronic device is currently being outputted. Ceasing to display the activatable indicator and displaying the non-activatable indicator to occupy the area occupied by the activatable indicator in response to receiving the voice communication enables a user to quickly and easily recognize that an outgoing voice communication cannot be made (e.g., recorded) at this time while the received voice communication is being played. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the activatable indicator (e.g., 622) occupies a third area of the communication user interface (e.g., 620) (e.g., an area that is the same as the first area and/or the second area) and wherein the first visual appearance of the activatable indicator has a first color pattern that includes a first predominant color (e.g., yellow; a color that makes up the majority of the colors of the activatable indicator) (840). In some embodiments, the predominant color is a background color. In some embodiments, in response to receiving the voice communication session, the electronic device (e.g., 600) displays (842), via the display device (e.g., 112), a non-activatable indicator that occupies the third area and has a second color pattern that includes the first predominant color (e.g., yellow).

Note that details of the processes described above with respect to method 800 (e.g., FIGS. 8A-8C) are also applicable in an analogous manner to the methods described above. For example, method 700 optionally includes one or more of the characteristics of the various methods described above with reference to method 800. For example, the contactable users managed via the first user interface (e.g., 602) described with reference to method 700 can be selected as requested participants in electronic voice communications sessions via the communication user interface (e.g., 620). For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve a process for performing voice communication between electronic devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify contactable users that can engage in voice communications with a user of an electronic device. Accordingly, use of such personal information data enables users to more easily engage in voice communications using electronic devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of enabling a user to be identified as a contactable user by an electronic device belonging to a different user, the present technology can be configured to allow users to select to "opt in" or "opt out" of participation in the collection of personal information data during registration for services or anytime thereafter. In another example, users can select not to be identified as a contactable user on electronic device associated with certain users (e.g., certain users that are not on the user's main contacts list) but be identified as a contactable user on electronic devices associated with certain other users (e.g., certain users that are on the user's main contacts list). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, contactable users can be added by inferring preferences based on non-personal information data or a bare minimum amount of personal information, such as the content being requested by the device associated with a user, other non-personal information available to or accessible by the user's electronic device, or publicly available information.

What is claimed is:

1. An electronic device, comprising:
   a display device;
   a wireless communication radio;
   one or more processors; and
   memory storing one or more programs configured to be executed by the one or more processors, the one or more programs including instructions for:
   receiving a first user input corresponding to a request to display a first user interface for a first communication application; and
   in response to receiving the first user input, displaying, on the display device, the first user interface, wherein displaying the first user interface includes concurrently displaying representations of a plurality of contactable users, including a first contactable user and a second contactable user, wherein concurrently displaying the representations of the plurality of contactable users includes:
   in accordance with a determination that a selectable user interface element is in an active state, wherein the active state enables electronic voice communications via the first communication application on the electronic device:
   in accordance with a determination that the first contactable user is associated with an accepted invitation to communicate with a user of the electronic device via the first communication application, displaying the representation of the first contactable user with a first value for a first visual property of the representation of the first contactable user;
   in accordance with a determination that the first contactable user has sent an invitation to the user of the electronic device to communicate via the first communication application that has not yet been accepted, displaying the representation of the first contactable user with the first value for the first visual property of the representation of the first contactable user;
   in accordance with a determination that the user of the electronic device has sent an invitation to the first contactable user to communicate via the first communication application that has not yet been accepted, displaying the representation of the first contactable user with a second value for the first visual property of the representation of the first contactable user that is different from the first value;
   in accordance with a determination that the second contactable user is associated with an accepted invitation to communicate with the user of the electronic device via the first communication application, displaying the representation of the second contactable user with the first value for a first visual property of the representation of the second contactable user;
   in accordance with a determination that the second contactable user has sent an invitation to the user of the electronic device to communicate via the first communication application that has not yet been accepted, displaying the representation of the second contactable user interface with the first value for the first visual property of the representation of the second contactable user; and
   in accordance with a determination that the user of the electronic device has sent an invitation to the second contactable user to communicate via the first communication application that has not yet been accepted, displaying the representation of the second contactable user with the second value for the first visual property of the representation of the second contactable user; and
   in accordance with a determination that the selectable user interface element is in an inactive state, wherein the inactive state disables electronic voice communications via the first communication application on the electronic device:
  in accordance with a determination that the first contactable user is associated with the accepted invitation to communicate with the user of the electronic device via the first communication application, displaying the representation of the first contactable user with a third value for the first visual property of the representation of the first contactable user, wherein the third value is different from the first value;
  in accordance with a determination that the first contactable user has sent an invitation to the user of the electronic device to communicate via the first communication application that has not yet been accepted, displaying the representation of the first contactable user with the third value for the first visual property of the representation of the first contactable user;
  in accordance with a determination that the user of the electronic device has sent an invitation to the first contactable user to communicate via the first communication application that has not yet been accepted, displaying the representation of the first contactable user with the second value for the first visual property of the representation of the first contactable user;
  in accordance with a determination that the second contactable user is associated with the accepted invitation to communicate with the user of the electronic device via the first communication application, displaying the representation of the second contactable user with the third value for the first visual property of the representation of the second contactable user;
  in accordance with a determination that the second contactable user has sent an invitation to the user of the electronic device to communicate via the first communication application that has not yet been accepted, displaying the representation of the second contactable user with the third value for the first visual property of the representation of the second contactable user; and
  in accordance with a determination that the user of the electronic device has sent an invitation to the second contactable user to communicate via the first communication application that has not yet been accepted, displaying the representation of the second contactable user with the second value for the first visual property of the representation of the second contactable user.

2. The electronic device of claim 1, wherein concurrently displaying the representations of the plurality of contactable users includes:
  in accordance with a determination that there is no invitation between the user of the device and the first contactable user to communicate via the first communication application, displaying the representation of the first contactable user with the second value for the first visual property of the representation of the first contactable user; and
  in accordance with a determination that there is no invitation between the user of the device and the second contactable user to communicate via the first communication application, displaying the representation of the second contactable user with the second value for the first visual property of the representation of the second contactable user.

3. The electronic device of claim 1, wherein the first user interface does not include a representation corresponding to a contactable user that cannot communicate with the user of the electronic device via the first communication application.

4. The electronic device of claim 1, wherein the first visual property of a representation corresponding to a respective user is a background color of the representation corresponding to the respective user.

5. The electronic device of claim 1, wherein:
  the representations of a plurality of contactable users are displayed as an ordered list; and
  representations of the plurality of contactable users that correspond to accepted invitations are at positions in the ordered list before positions of representations of the plurality of contactable users that correspond to contactable users that have sent invitations to the user of the electronic device to communicate via the first communication application that have not yet been accepted and before positions of representations of the plurality of contactable users that correspond to contactable users that the user of the electronic device has sent invitations to communicate via the first communication application that have not yet been accepted.

6. The electronic device of claim 5, wherein representations of the plurality of contactable users that correspond to contactable users that have sent invitations to the user of the electronic device to communicate via the first communication application that have not yet been accepted are at positions in the ordered list before positions of representations of the plurality of contactable users that correspond to contactable users that the user of the electronic device has sent invitations to communicate via the first communication application that have not yet been accepted.

7. The electronic device of claim 1, the one or more programs further including instructions for:
  in accordance with a determination that the first contactable user has sent an invitation to the user of the electronic device to communicate via the first communication application that has not yet been accepted, displaying, in association with the representation of the first contactable user:
    an accept affordance that, when selected, accepts the invitation from the first contactable user to the user of the electronic device to communicate via the first communication application; and
    a decline affordance that, when selected, declines the invitation from the first contactable user to the user of the electronic device to communicate via the first communication application.

8. The electronic device of claim 1, wherein displaying the first user interface includes:
  displaying an add affordance that, when selected, initiates a process for sending an invitation to a third contactable user to communicate via the first communication application.

9. The electronic device of claim 1, wherein the user of the electronic device has sent an invitation to the first contactable user to communicate via the first communication application that has not yet been accepted and the representation of the first user is displayed with the second value for the first visual property of the representation of the first contactable user, the one or more programs further including instructions for:

receiving a second user input corresponding to the representation of the first contactable user; and in response to receiving the second user input, displaying, via the display device, a second user interface that includes:
- a re-invite affordance that, when selected, sends another invitation to the first contactable user to communicate via the first communication application; and
- a rescind invitation affordance that, when selected, rescinds the invitation to the first contactable user to communicate via the first communication application.

10. The electronic device of claim 1, the one or more programs further including instructions for:

receiving a third user input corresponding to a representation of a fourth contactable user that is displayed with the first value for the first visual property of the representation of the fourth contactable user; and in response to receiving the third user input, initiating a process for establishing a communication session with the fourth contactable user using the first communication application.

11. A non-transitory computer-readable storage medium storing one or more programs configured to be executed by one or more processors of an electronic device with a display device and a wireless communication radio, the one or more programs including instructions for:

receiving a first user input corresponding to a request to display a first user interface for a first communication application; and in response to receiving the first user input, displaying, on the display device, the first user interface, wherein displaying the first user interface includes concurrently displaying representations of a plurality of contactable users, including a first contactable user and a second contactable user, wherein concurrently displaying the representations of the plurality of contactable users includes:

in accordance with a determination that a selectable user interface element is in an active state, wherein the active state enables electronic voice communications via the first communication application on the electronic device:

in accordance with a determination that the first contactable user is associated with an accepted invitation to communicate with a user of the electronic device via the first communication application, displaying the representation of the first contactable user with a first value for a first visual property of the representation of the first contactable user;

in accordance with a determination that the first contactable user has sent an invitation to the user of the electronic device to communicate via the first communication application that has not yet been accepted, displaying the representation of the first contactable user with the first value for the first visual property of the representation of the first contactable user;

in accordance with a determination that the user of the electronic device has sent an invitation to the first contactable user to communicate via the first communication application that has not yet been accepted, displaying the representation of the first contactable user with a second value for the first visual property of the representation of the first contactable user that is different from the first value;

in accordance with a determination that the second contactable user is associated with an accepted invitation to communicate with the user of the electronic device via the first communication application, displaying the representation of the second contactable user with the first value for a first visual property of the representation of the second contactable user;

in accordance with a determination that the second contactable user has sent an invitation to the user of the electronic device to communicate via the first communication application that has not yet been accepted, displaying the representation of the second contactable user with the first value for the first visual property of the representation of the second contactable user; and in accordance with a determination that the user of the electronic device has sent an invitation to the second contactable user to communicate via the first communication application that has not yet been accepted, displaying the representation of the second contactable user with the second value for the first visual property of the representation of the second contactable user; and in accordance with a determination that the selectable user interface element is in an inactive state, wherein the inactive state disables electronic voice communications via the first communication application on the electronic device:

in accordance with a determination that the first contactable user is associated with the accepted invitation to communicate with the user of the electronic device via the first communication application, displaying the representation of the first contactable user with a third value for the first visual property of the representation of the first contactable user, wherein the third value is different from the first value;

in accordance with a determination that the first contactable user has sent an invitation to the user of the electronic device to communicate via the first communication application that has not yet been accepted, displaying the representation of the first contactable user with the third value for the first visual property of the representation of the first contactable user;

in accordance with a determination that the user of the electronic device has sent an invitation to the first contactable user to communicate via the first communication application that has not yet been accepted, displaying the representation of the first contactable user with the second value for the first visual property of the representation of the first contactable user;

in accordance with a determination that the second contactable user is associated with the accepted invitation to communicate with the user of the electronic device via the first communication application, displaying the representation of the second contactable user with the third value for the first visual property of the representation of the second contactable user;

in accordance with a determination that the second contactable user has sent an invitation to the user of the electronic device to communicate via the first communication application that has not yet been accepted, displaying the representation of the second contactable user with the third value for the first visual property of the representation of the second contactable user; and in accordance with a determination that the user of the electronic device has sent an invitation to the second contactable user to communicate via the first communication application that has not yet been accepted, displaying the representation of the second contactable user with the second value for the first visual property of the representation of the second contactable user.

12. The non-transitory computer-readable storage medium of claim 11, wherein concurrently displaying the representations of the plurality of contactable users includes:

in accordance with a determination that there is no invitation between the user of the device and the first contactable user to communicate via the first communication application, displaying the representation of the first contactable user with the second value for the first visual property of the representation of the first contactable user; and in accordance with a determination that there is no invitation between the user of the device and the second contactable user to communicate via the first communication application, displaying the representation of the second contactable user with the second value for the first visual property of the representation of the second contactable user.

13. The non-transitory computer-readable storage medium of claim 11, wherein the first user interface does not include a representation corresponding to a contactable user that cannot communicate with the user of the electronic device via the first communication application.

14. The non-transitory computer-readable storage medium of claim 11, wherein the first visual property of a representation corresponding to a respective user is a background color of the representation corresponding to the respective user.

15. The non-transitory computer-readable storage medium of claim 11, wherein:

the representations of a plurality of contactable users are displayed as an ordered list; and representations of the plurality of contactable users that correspond to accepted invitations are at positions in the ordered list before positions of representations of the plurality of contactable users that correspond to contactable users that have sent invitations to the user of the electronic device to communicate via the first communication application that have not yet been accepted and before positions of representations of the plurality of contactable users that correspond to contactable users that the user of the electronic device has sent invitations to communicate via the first communication application that have not yet been accepted.

16. The non-transitory computer-readable storage medium of claim 15, wherein representations of the plurality of contactable users that correspond to contactable users that have sent invitations to the user of the electronic device to communicate via the first communication application that have not yet been accepted are at positions in the ordered list before positions of representations of the plurality of contactable users that correspond to contactable users that the user of the electronic device has sent invitations to communicate via the first communication application that have not yet been accepted.

17. The non-transitory computer-readable storage medium of claim 11, the one or more programs further including instructions for:

in accordance with a determination that the first contactable user has sent an invitation to the user of the electronic device to communicate via the first communication application that has not yet been accepted, displaying, in association with the representation of the first contactable user:

an accept affordance that, when selected, accepts the invitation from the first contactable user to the user of the electronic device to communicate via the first communication application; and a decline affordance that, when selected, declines the invitation from the first contactable user to the user of the electronic device to communicate via the first communication application.

18. The non-transitory computer-readable storage medium of claim 11, wherein displaying the first user interface includes:

displaying an add affordance that, when selected, initiates a process for sending an invitation to a third contactable user to communicate via the first communication application.

19. The non-transitory computer-readable storage medium of claim 11, wherein the user of the electronic device has sent an invitation to the first contactable user to communicate via the first communication application that has not yet been accepted and the representation of the first user is displayed with the second value for the first visual property of the representation of the first contactable user, the one or more programs further including instructions for:

receiving a second user input corresponding to the representation of the first contactable user; and in response to receiving the second user input, displaying, via the display device, a second user interface that includes:

a re-invite affordance that, when selected, sends another invitation to the first contactable user to communicate via the first communication application; and a rescind invitation affordance that, when selected, rescinds the invitation to the first contactable user to communicate via the first communication application.

20. The non-transitory computer-readable storage medium of claim 11, the one or more programs further including instructions for:

receiving a third user input corresponding to a representation of a fourth contactable user that is displayed with the first value for the first visual property of the representation of the fourth contactable user; and in response to receiving the third user input, initiating a process for establishing a communication session with the fourth contactable user using the first communication application.

21. A method comprising:

at an electronic device with a display device and a wireless communication radio:

receiving a first user input corresponding to a request to display a first user interface for a first communication application; and in response to receiving the first user input, displaying, on the display device, the first user interface, wherein displaying the first user interface includes concurrently displaying representations of a plurality of contactable users, including a first contactable user and a second contactable user, wherein concurrently displaying the representations of the plurality of contactable users includes:
in accordance with a determination that a selectable user interface element is in an active state, wherein the active state enables electronic voice communications via the first communication application on the electronic device:
in accordance with a determination that the first contactable user is associated with an accepted invitation to communicate with a user of the electronic device via the first communication application, displaying the representation of the first contactable user with a first value for a first visual property of the representation of the first contactable user;
in accordance with a determination that the first contactable user has sent an invitation to the user of the electronic device to communicate via the first communication application that has not yet been accepted, displaying the representation of the first contactable user with the first value for the first visual property of the representation of the first contactable user;
in accordance with a determination that the user of the electronic device has sent an invitation to the first contactable user to communicate via the first communication application that has not yet been accepted, displaying the representation of the first contactable user with a second value for the first visual property of the representation of the first contactable user that is different from the first value;
in accordance with a determination that the second contactable user is associated with an accepted invitation to communicate with the user of the electronic device via the first communication application, displaying the representation of the second contactable user with the first value for a first visual property of the representation of the second contactable user;
in accordance with a determination that the second contactable user has sent an invitation to the user of the electronic device to communicate via the first communication application that has not yet been accepted, displaying the representation of the second contactable user with the first value for the first visual property of the representation of the second contactable user; and
in accordance with a determination that the user of the electronic device has sent an invitation to the second contactable user to communicate via the first communication application that has not yet been accepted, displaying the representation of the second contactable user with the second value for the first visual property of the representation of the second contactable user; and
in accordance with a determination that the selectable user interface element is in an inactive state, wherein the inactive state disables electronic voice communications via the first communication application on the electronic device:
in accordance with a determination that the first contactable user is associated with the accepted invitation to communicate with the user of the electronic device via the first communication application, displaying the representation of the first contactable user with a third value for the first visual property of the representation of the first contactable user, wherein the third value is different from the first value;
in accordance with a determination that the first contactable user has sent an invitation to the user of the electronic device to communicate via the first communication application that has not yet been accepted, displaying the representation of the first contactable user with the third value for the first visual property of the representation of the first contactable user;
in accordance with a determination that the user of the electronic device has sent an invitation to the first contactable user to communicate via the first communication application that has not yet been accepted, displaying the representation of the first contactable user with the second value for the first visual property of the representation of the first contactable user;
in accordance with a determination that the second contactable user is associated with the accepted invitation to communicate with the user of the electronic device via the first communication application, displaying the representation of the second contactable user with the third value for the first visual property of the representation of the second contactable user;
in accordance with a determination that the second contactable user has sent an invitation to the user of the electronic device to communicate via the first communication application that has not yet been accepted, displaying the representation of the second contactable user with the third value for the first visual property of the representation of the second contactable user; and
in accordance with a determination that the user of the electronic device has sent an invitation to the second contactable user to communicate via the first communication application that has not yet been accepted, displaying the representation of the second contactable user with the second value for the first visual property of the representation of the second contactable user.

22. The method of claim 21, wherein concurrently displaying the representations of the plurality of contactable users includes:
in accordance with a determination that there is no invitation between the user of the device and the first contactable user to communicate via the first communication application, displaying the representation of the first contactable user with the second value for the first visual property of the representation of the first contactable user; and
in accordance with a determination that there is no invitation between the user of the device and the second contactable user to communicate via the first communication application, displaying the representation of the second contactable user with the second value for the first visual property of the representation of the second contactable user.

23. The method of claim 21, wherein the first user interface does not include a representation corresponding to a contactable user that cannot communicate with the user of the electronic device via the first communication application.

24. The method of claim 21, wherein the first visual property of a representation corresponding to a respective user is a background color of the representation corresponding to the respective user.

25. The method of claim 21, wherein:
the representations of a plurality of contactable users are displayed as an ordered list; and
representations of the plurality of contactable users that correspond to accepted invitations are at positions in the ordered list before positions of representations of the plurality of contactable users that correspond to contactable users that have sent invitations to the user of the electronic device to communicate via the first communication application that have not yet been accepted and before positions of representations of the plurality of contactable users that correspond to contactable users that the user of the electronic device has sent invitations to communicate via the first communication application that have not yet been accepted.

26. The method of claim 25, wherein representations of the plurality of contactable users that correspond to contactable users that have sent invitations to the user of the electronic device to communicate via the first communication application that have not yet been accepted are at positions in the ordered list before positions of representations of the plurality of contactable users that correspond to contactable users that the user of the electronic device has sent invitations to communicate via the first communication application that have not yet been accepted.

27. The method of claim 21, further comprising:
in accordance with a determination that the first contactable user has sent an invitation to the user of the electronic device to communicate via the first communication application that has not yet been accepted, displaying, in association with the representation of the first contactable user:
an accept affordance that, when selected, accepts the invitation from the first contactable user to the user of the electronic device to communicate via the first communication application; and
a decline affordance that, when selected, declines the invitation from the first contactable user to the user of the electronic device to communicate via the first communication application.

28. The method of claim 21, wherein displaying the first user interface includes:
displaying an add affordance that, when selected, initiates a process for sending an invitation to a third contactable user to communicate via the first communication application.

29. The method of claim 21, wherein the user of the electronic device has sent an invitation to the first contactable user to communicate via the first communication application that has not yet been accepted and the representation of the first user is displayed with the second value for the first visual property of the representation of the first contactable user, further comprising:
receiving a second user input corresponding to the representation of the first contactable user; and
in response to receiving the second user input, displaying, via the display device, a second user interface that includes:
a re-invite affordance that, when selected, sends another invitation to the first contactable user to communicate via the first communication application; and
a rescind invitation affordance that, when selected, rescinds the invitation to the first contactable user to communicate via the first communication application.

30. The method of claim 21, further comprising:
receiving a third user input corresponding to a representation of a fourth contactable user that is displayed with the first value for the first visual property of the representation of the fourth contactable user; and
in response to receiving the third user input, initiating a process for establishing a communication session with the fourth contactable user using the first communication application.

* * * * *